United States Patent
Hamada et al.

(10) Patent No.: US 7,437,055 B2
(45) Date of Patent: Oct. 14, 2008

(54) RECORDING APPARATUS AND METHOD, REPRODUCING APPARATUS AND METHOD, RECORDED MEDIUM, AND PROGRAM

(75) Inventors: Toshiya Hamada, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1228 days.

(21) Appl. No.: 10/018,682

(22) PCT Filed: Apr. 20, 2001

(86) PCT No.: PCT/JP01/03416

§ 371 (c)(1),
(2), (4) Date: Apr. 12, 2002

(87) PCT Pub. No.: WO01/82609

PCT Pub. Date: Nov. 1, 2001

(65) Prior Publication Data

US 2002/0135608 A1    Sep. 26, 2002

(30) Foreign Application Priority Data

Apr. 21, 2000  (JP) .............................. 2000-185479

(51) Int. Cl.
*H04N 5/91* (2006.01)
(52) U.S. Cl. .............................. 386/69; 386/70; 386/95
(58) Field of Classification Search .................. 386/55, 386/95, 111, 125, 69, 70; 358/453; 345/638, 345/619
See application file for complete search history.

(56) References Cited

U.S. PATENT DOCUMENTS 5,889,916 A    3/1999   Kimura et al.
6,005,679 A *  12/1999  Haneda .................... 358/453
6,215,746 B1 * 4/2001   Ando et al. ................ 369/53.2

(Continued)

FOREIGN PATENT DOCUMENTS

| EP | 1 052 644 | 11/2000 |
|---|---|---|
| JP | 11-213524 | 8/1999 |

(Continued)

OTHER PUBLICATIONS

U.S. Appl. No. 11/752,127, filed May 22, 2007, Kato et al.

(Continued)

*Primary Examiner*—Thai Tran
*Assistant Examiner*—Hung Q Dang
(74) *Attorney, Agent, or Firm*—Oblon, Spivak, McClelland, Maier & Neustadt, P.C.

(57) ABSTRACT

From input moving picture data, a thumbnail picture representing the moving picture data is generated as first thumbnail data. Form the moving picture data, a thumbnail picture of a picture extracted as being a characteristic picture, or a thumbnail picture of a picture specified by a user, is generated as second thumbnail data, and the first and second thumbnail data are recorded as respective independent groups on the recording medium. So, the user is allowed to select recorded data readily using the recorded picture data.

17 Claims, 34 Drawing Sheets

U.S. PATENT DOCUMENTS

| | | | |
|---|---|---|---|
| 6,357,042 B2 * | 3/2002 | Srinivasan et al. | 725/32 |
| 6,553,180 B1 * | 4/2003 | Kikuchi et al. | 386/95 |
| 6,904,227 B1 * | 6/2005 | Yamamoto et al. | 386/52 |
| 2001/0016108 A1 * | 8/2001 | Itoh et al. | 386/46 |
| 2002/0135608 A1 | 9/2002 | Hamada et al. | |

FOREIGN PATENT DOCUMENTS

| | | |
|---|---|---|
| JP | 11-273227 | 10/1999 |
| JP | 2000-083204 | 3/2000 |
| WO | WO 99 38167 | 7/1999 |
| WO | WO 99/38167 * | 7/1999 |

OTHER PUBLICATIONS

U.S. Appl. No. 11/752,117, filed May 22, 2007, Kato et al.

Patent Abstracts of Japan, vol. 1998, No. 11, Sep. 30, 1998 & JP 10 174040 A (Sony Corp), Jun. 26, 1998.

Patent Abstracts of Japan vol. 2000, No. 14, Mar. 5, 2001 & JP 2000 311419 A (Alpine Electronics Inc), Nov. 7, 2000.

Patent Abstracts of Japan, vol. 017, No. 166 (P-1514), Mar. 30, 1993 & JP 04 328375 A (Canon Inc), Nov. 17, 1992.

* cited by examiner

| SYNTAX | NUMBER OF BYTES | ABBREVIATION |
|---|---|---|
| info.dvr { | | |
|     TableOfPlayLists_Start_address | 32 | uimsbf |
|     MakerPrivateData_Start_address | 32 | uimsbf |
|     reserved | 192 | bslbf |
|     DVRVolume() | | |
|     for (i=0;i<N1;i++){ | | |
|         padding_word | 16 | bslbf |
|     } | | |
|     TableOfPlayLists() | | |
|     for (i=0;i<N2;i++){ | | |
|         padding_word | 16 | bslbf |
|     } | | |
|     MakerPrivateData() | | |
| } | | |

FIG.5

| SYNTAX | NUMBER OF BYTES | ABBREVIATION |
|---|---|---|
| DVRVolume(){ | | |
|     version_number | 8*4 | bslbf |
|     length | 32 | uimsbf |
|     ResumeVolume() | | |
|     UIAppInfoVolume() | | |
| } | | |

FIG.6

| SYNTAX | NUMBER OF BYTES | ABBREVIATION |
|---|---|---|
| UIAppInfoVolume() { | | |
|     character_set | 8 | bslbf |
|     name_length | 8 | uimsbf |
|     Volume_name | 8*256 | bslbf |
|     reserved | 15 | bslbf |
|     Volume_protect_flag | 1 | bslbf |
|     PIN | 8*4 | bslbf |
|     ref_thumbnail_index | 16 | uimsbf |
|     reserved | 7 | bslbf |
|     rp_info_valid_flag | 1 | uimsbf |
|     rp_ref_to_PlayList_file_name | 8*10 | bslbf |
|     rp_ref_to_PlayItem_id | 16 | uimsbf |
|     rp_time_stamp | 32 | uimsbf |
| } | | |

FIG.7

| SYNTAX | NUMBER OF BYTES | ABBREVIATION |
|---|---|---|
| TableOfPlayLists() { | | |
|     version_number | 8*4 | bslbf |
|     length | 32 | uimsbf |
|     number_of_PlayLists | 16 | uimsbf |
|     for (i=0; i<*number_of_PlayLists*; i++){ | | |
|         PlayList_file_name | 8*10 | bslbf |
|         UIAppInfoPlayList2() | | |
|     } | | |
| } | | |

FIG.8

| SYNTAX | NUMBER OF BYTES | ABBREVIATION |
|---|---|---|
| UIAppInfoPlayList2(){ | | |
| character_set | 8 | bslbf |
| name_length | 8 | uimsbf |
| PlayList_name | 8*256 | bslbf |
| reserved | 8 | bslbf |
| record_time_and_date | 4*14 | bslbf |
| reserved | 8 | bslbf |
| duration | 4*6 | bslbf |
| valid_period | 4*8 | bslbf |
| maker_id | 16 | bslbf |
| maker_code | 16 | bslbf |
| reserved | 11 | bslbf |
| playback_control_flag | 1 | bslbf |
| write_protect_flag | 1 | bslbf |
| is_played_flag | 1 | bslbf |
| archive | 2 | bslbf |
| ref_thumbnail_index | 16 | uimsbf |
| reserved | 7 | bslbf |
| rp_info_valid_flag | 1 | uimsbf |
| rp_ref_to_PlayItem_id | 16 | uimsbf |
| rp_time_stamp | 32 | uimsbf |
| reserved_for_future_use | 240 | bslbf |
| } | | |

FIG.9

| SYNTAX | NUMBER OF BYTES | ABBREVIATION |
|---|---|---|
| zzzzz.clpi { | | |
|     STC_Info_Start_address | 32 | uimsbf |
|     ProgramInfo_Start_address | 32 | uimsbf |
|     CPI_Start_address | 32 | uimsbf |
|     ClipMark_Start_address | 32 | uimsbf |
|     MakerPrivateData_Start_address | 32 | uimsbf |
|     reserved | 96 | bslbf |
|     ClipInfo() | | |
|     for (i=0;i<N1;i++){ | | |
|         padding_word | 16 | bslbf |
|     } | | |
|     STC_Info() | | |
|     for (i=0;i<N2;i++){ | | |
|         padding_word | 16 | bslbf |
|     } | | |
|     ProgramInfo() | | |
|     for (i=0;i<N3;i++){ | | |
|         padding_word | 16 | bslbf |
|     } | | |
|     CPI() | | |
|     for (i=0;i<N4;i++){ | | |
|         padding_word | 16 | bslbf |
|     } | | |
|     ClipMark() | | |
|     for (i=0;i<N5;i++){ | | |
|         padding_word | 16 | bslbf |
|     } | | |
|     MakerPrivateData() | | |
| } | | |

FIG.10

| SYNTAX | NUMBER OF BYTES | ABBREVIATION |
|---|---|---|
| ClipMark(){ | | |
|     version_number | 8*4 | bslbf |
|     length | 32 | uimsbf |
|     number_of_Clip_marks | 16 | uimsbf |
|     for (i=0; i<*number_of_Clip_marks*; i++){ | | |
|         reserved | 8 | bslbf |
|         mark_type | 8 | bslbf |
|         mark_time_stamp | 32 | uimsbf |
|         STC_sequence_id | 8 | uimsbf |
|         reserved | 24 | bslbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.11

| SYNTAX | NUMBER OF BYTES | ABBREVIATION |
|---|---|---|
| xxxxx.rpls / yyyyy.vpls { | | |
| PlayListMark_Start_address | 32 | uimsbf |
| MakerPrivateData_Start_address | 32 | uimsbf |
| reserved | 192 | bslbf |
| PlayList() | | |
| for (i=0;i<N1;i++){ | | |
| padding_word | 16 | bslbf |
| } | | |
| PlayListMark() | | |
| for (i=0;i<N2;i++){ | | |
| padding_word | 16 | bslbf |
| } | | |
| MakerPrivateData() | | |
| } | | |

FIG.13

| SYNTAX | NUMBER OF BYTES | ABBREVIATION |
|---|---|---|
| PlayList() { | | |
|     version_number | 8*4 | bslbf |
|     length | 32 | uimsbf |
|     PlayList_type | 8 | uimsbf |
|     CPI_type | 1 | bslbf |
|     reserved | 7 | bslbf |
|     UIAppInfoPlayList() | | |
|     number_of_PlayItems    // main path | 16 | uimsbf |
|     if (<Vertual PlayList>){ | | |
|         number_of_SubPlayItems  // sub path | 16 | uimsbf |
|     }else{ | | |
|         reserved | 16 | bslbf |
|     } | | |
|     for (*PlayItem_id*=0;<br>        *PlayItem_id*<*nymber_of_PlayItems*;<br>        *PlayItem_id*++){ | | |
|         PlayItem()    //main path | | |
|     } | | |
|     if (<*Virtual PlayList*>){ | | |
|         if (CPI_type==0 && PlayList_type==0){ | | |
|             for (i=0; i<*number_of_SubPlayItems*; i++) | | |
|             SubPlayItem()  //sub path | | |
|         } | | |
|     } | | |
| } | | |

FIG.14

| SYNTAX | NUMBER OF BYTES | ABBREVIATION |
|---|---|---|
| PlayItem(){ | | |
|     Clip_information_file_name | 8*10 | bslbf |
|     reserved | 24 | bslbf |
|     STC_sequence_id | 8 | uimsbf |
|     IN_time | 32 | uimsbf |
|     OUT_time | 32 | uimsbf |
|     reserved | 14 | bslbf |
|     connection_condition | 2 | bslbf |
|     if (<Virtual PlayList>){ | | |
|         if (*connection_condition*=='*10*'){ | | |
|             BridgeSequenceInfo() | | |
|         } | | |
|     } | | |
| } | | |

FIG.15

| SYNTAX | NUMBER OF BYTES | ABBREVIATION |
|---|---|---|
| PlayListMark() { | | |
|     version_number | 8*4 | bslbf |
|     length | 32 | uimsbf |
|     number_of_PlayList_marks | 16 | uimsbf |
|     for (i=0;i<number_of_PlayList_marks;i++){ | | |
|         reserved | 8 | bslbf |
|         mark_type | 8 | bslbf |
|         mark_time_stamp | 32 | uimsbf |
|         PlayItem_id | 8 | uimsbf |
|         reserved | 24 | uimsbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.16

| SYNTAX | NUMBER OF BYTES | ABBREVIATION |
|---|---|---|
| menu.thmb/mark.thmb { | | |
|     reserved | 256 | bslbf |
|     Thumbnail() | | |
|     for (i=0;i<N1;i++) | | |
|         padding_word | 16 | bslbf |
| } | | |

FIG.21

| SYNTAX | NUMBER OF BYTES | ABBREVIATION |
|---|---|---|
| Thumbnail(){ | | |
|     version_number | 8*4 | char |
|     length | 32 | uimsbf |
|     if (length !=0){ | | |
|         tn_blocks_start_address | 32 | bslbf |
|         number_of_thumbnails | 16 | uimsbf |
|         tn_block_size | 16 | uimsbf |
|         number_of_tn_blocks | 16 | uimsbf |
|         reserved | 16 | bslbf |
|         for (i=0; i<*number_of_thumbnails*; i++){ | | |
|             thumbnail_index | 16 | uimsbf |
|             thumbnail_picture_format | 8 | bslbf |
|             reserved | 8 | bslbf |
|             picture_data_size | 32 | uimsbf |
|             start_tn_block_number | 16 | uimsbf |
|             x_picture_length | 16 | uimsbf |
|             y_picture_length | 16 | uimsbf |
|             reserved | 16 | uimsbf |
|         } | | |
|         stuffing_bytes | 8*2*L1 | bslbf |
|         for(k=0; k<*number_of_tn_blocks*; k++){ | | |
|             tn_block | fixed | |
|         } | | |
|     } | | |
| } | | |

FIG.22

| Thumbnail_picture_format | MEANING |
|---|---|
| 0x00 | MPEG-2 Video I-picture |
| 0x01 | DCF (restricted JPEG) |
| 0x02 | PNG |
| 0x03-0xff | reserved |
FIG.23
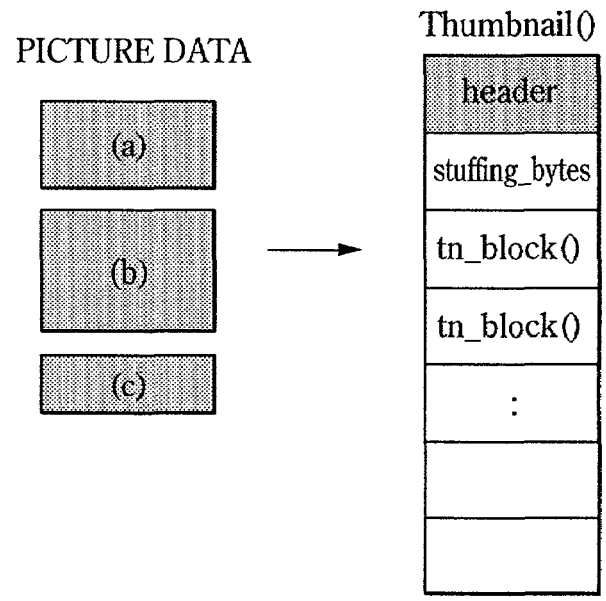
FIG.24A
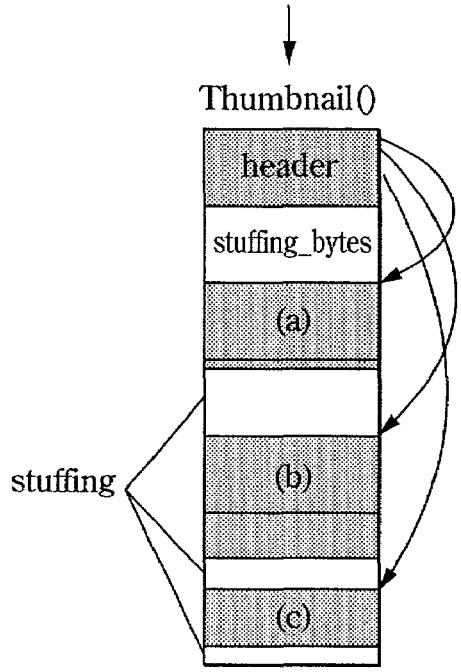
FIG.24B

| SYNTAX | NUMBER OF BYTES | ABBREVIATION |
|---|---|---|
| menu.thmb/xxxxx.thmb { | | |
|     reserved | 256 | bslbf |
|     Thumbnail() | | |
|         for (i=0;i<N1;i++) | | |
|             padding_word | 16 | bslbf |
| } | | |

FIG.26

| SYNTAX | NUMBER OF BYTES | ABBREVIATION |
|---|---|---|
| TableOfPlayLists(){ | | |
|     version_number | 8*4 | bslbf |
|     length | 32 | uimsbf |
|     number_of_PlayLists | 16 | uimsbf |
|     for (i=0; i<*number_of_PlayLists*; i++){ | | |
|         PlayList_file_name | 8*10 | bslbf |
|     } | | |
| } | | |

FIG.27

| SYNTAX | NUMBER OF BYTES | ABBREVIATION |
|---|---|---|
| PlayList() { | | |
|     version_number | 8*4 | bslbf |
|     length | 32 | uimsbf |
|     PlayList_type | 8 | uimsbf |
|     CPI_type | 1 | bslbf |
|     reserved | 7 | bslbf |
|     UIAppInfoPlayList() | | |
|     number_of_PlayItems    // main path | 16 | uimsbf |
|     if (<Vertual PlayList>) { | | |
|         number_of_SubPlayItems  // sub path | 16 | uimsbf |
|     } else { | | |
|         reserved | 16 | bslbf |
|     } | | |
|     for (PlayItem_id=0;<br>        PlayItem_id<nymber_of_PlayItems;<br>        PlayItem_id++) { | | |
|         PlayItem()        //main path | | |
|     } | | |
|     if (<Virtual PlayList>) { | | |
|         if (CPI_type==0 && PlayList_type==0) { | | |
|             for (i=0; i<number_of_SubPlayItems; i++) | | |
|                 SubPlayItem()   //sub path | | |
|         } | | |
|     } | | |
| } | | |

FIG.28

| SYNTAX | NUMBER OF BYTES | ABBREVIATION |
|---|---|---|
| UIAppInfoPlayList() { | | |
|     character_set | 8 | bslbf |
|     name_length | 8 | uimsbf |
|     PlayList_name | 8*256 | bslbf |
|     reserved | 8 | bslbf |
|     record_time_and_date | 4*14 | bslbf |
|     reserved | 8 | bslbf |
|     duration | 4*6 | bslbf |
|     valid_period | 4*8 | bslbf |
|     maker_id | 16 | uimsbf |
|     maker_code | 16 | uimsbf |
|     reserved | 11 | bslbf |
|     playback_control_flag | 1 | bslbf |
|     write_protect_flag | 1 | bslbf |
|     is_played_flag | 1 | bslbf |
|     archive | 2 | bslbf |
|     ref_thumbnail_index | 16 | uimsbf |
|     reserved_for_future_use | 240 | bslbf |
| } | | |

FIG.29

| SYNTAX | NUMBER OF BYTES | ABBREVIATION |
|---|---|---|
| menu.tidx/mark.tidx(){ | | |
|     version_number | 8*4 | char |
|     reserved_for_future_use | 256 | bslbf |
|     length | 32 | uimsbf |
|     if (length !=0){ | | |
|         number_of_thumbnails | 16 | uimsbf |
|         tn_block_size | 16 | uimsbf |
|         number_of_tn_blocks | 16 | uimsbf |
|         for (i=0; i<*number_of_thumbnails*; i++){ | | |
|             thumbnail_index | 16 | uimsbf |
|             ref_to_tn_block_id | 16 | uimsbf |
|             picture_byte_size | 32 | uimsbf |
|             horizontal_picture_size | 16 | uimsbf |
|             vertical_picture_size | 16 | uimsbf |
|             display_aspect_ratio | 4 | uimsbf |
|             color_space | 4 | uimsbf |
|             reserved_for_word_align | 8 | bslbf |
|         } | | |
|     } | | |
| } | | |

FIG.33

| display_aspect_ratio | MEANING |
|---|---|
| 0, 1 | reserved for future use |
| 2 | 4:3 display aspect ratio |
| 3 | 16:9 display aspect ratio |
| 4-15 | reserved for future use |

FIG.34

| display_aspect_ratio | MEANING |
|---|---|
| 0 | BT 709 |
| 1 | ITU-R Rec.601 |
| 2-15 | reserved for future use |

FIG.35

| SYNTAX | NUMBER OF BYTES | ABBREVIATION |
|---|---|---|
| menu.tdat/mark.tdat { | | |
| for (tn_block_id=0; tn_block_id<number_of_tn_blocks; tn_block_id++){ | | |
| tn_block | tn_block_size*1024*8 | |
| } | | |
| } | | |

FIG.36

RECORDING APPARATUS AND METHOD, REPRODUCING APPARATUS AND METHOD, RECORDED MEDIUM, AND PROGRAM

TECHNICAL FIELD

This invention relates to a recording method and apparatus, a reproducing method and apparatus, a recording medium and a program, in which a thumbnail, representative of a picture, is appended to data.

BACKGROUND ART

Recently, a variety of types of optical discs have been proposed as a recording medium that can be removed from a recording apparatus. These recordable optical discs have been proposed as a large capacity medium of several GBs and are thought to be promising as a medium for recording AV (audio visual) signals, such as video signals. Among the sources (supply sources) of digital AV signal, to be recorded on this recordable optical disc, there are CS digital satellite broadcast and BS digital broadcast. Additionally, the ground wave television broadcast of the digital system has also been proposed for future use.

The digital video signals, supplied from these sources, are routinely compressed under the MPEG (Moving Picture Experts Group) 2 system. In a recording apparatus, a recording rate proper to the apparatus is set. If digital video signals of the digital broadcast are recorded in the conventional image storage mediums for domestic use, digital video signals are first decoded and subsequently bandwidth-limited for recording. In the case of the digital recording system, including, of course, the MPEG1 Video, MPEG2 video and DV system, digital video signals are first decoded and subsequently re-encoded in accordance with the recording rate and the encoding system proper to the apparatus for subsequent recording.

However, this recording system, in which the supplied bitstream is decoded once and subsequently bandwidth-limited and re-encoded prior to recording, suffers from the deteriorated picture quality. If, in recording compressed digital signals, the transmission rate of input digital signals is less than the recording rate for the recording and/or reproducing apparatus, the method of directly recording the supplied bitstream without decoding or re-encoding suffers from deterioration in the picture quality to the least extent. However, if the transmission rate of the input digital signals exceeds the recording rate of the recording and/or reproducing apparatus, it is indeed necessary to re-encode the bitstream and to record the so re-encoded bitstream, so that, after decoding in the recording and/or reproducing apparatus, the transmission rate will be not higher than the upper limit of the disc recording rate.

If the bitstream is transmitted in a variable rate system in which the bit rate of the input digital signal is increased or decreased with time, the capacity of the recording medium can be exploited less wastefully with a disc recording apparatus adapted for transiently storing data in a buffer and for recording the data in a burst fashion than with a tape recording system having a fixed recording rate imposed by the fixed rpm of the rotary head.

Thus, it may be predicted that, in the near future when the digital broadcast is to become the mainstream, an increasing demand will be raised for a recording and/or reproducing apparatus in which broadcast signals are recorded as digital signals, without decoding or re-encoding, as in a data streamer, and in which a disc is used as a recording medium.

In reproducing a recording medium, having recorded thereon plural data, such as data of program made up e.g., of video or speech data, using the above-described apparatus, there is presented a problem that, with an increasing volume of data recorded on the recording medium, the pre-playback processing, such as processing as to which program is to be reproduced or from which scene the program is to be reproduced, becomes complicated.

DISCLOSURE OF THE INVENTION

It is an object of the present invention to enable data for reproduction to be selected easily by adding a thumbnail representative of the data to the data to be reproduced.

A recording method according to the present invention a recording apparatus including means for generating, from input moving picture data, a thumbnail picture representing the moving picture data, as first thumbnail data, and for generating, from the moving picture data, a thumbnail picture of a picture extracted as a characteristic picture, or a thumbnail picture of a picture specified by a user, as a second thumbnail data, and means for recording the first thumbnail data and the second thumbnail data, generated by the generating means as independent groups on a recording medium.

Preferably, the generating means generates the first and second thumbnail data as respective independent files.

Preferably, the generating means generates the first and second thumbnail data as respective independent data blocks and as one file.

Preferably, the generating means generates first management data supervising the first thumbnail data with a number corresponding to the first thumbnail data. The generating means also generates second management data supervising the second thumbnail data with a number corresponding to the second thumbnail data, whilst the recording means records the first and second management data in the recording medium.

Preferably, the first and second management data include data specifying the format of the picture data of the thumbnail data being supervised.

Preferably, the recording means records picture data of the thumbnail picture contained in the first or second management data in terms of a block of a preset size as a unit.

Preferably, the recording means records the information representing the referencing destination of the first thumbnail data as a separate file on the recording medium.

Preferably, the recording means further records the information indicating the referencing destination of the thumbnail picture contained in the second thumbnail data.

A recording method according to the present invention includes a generating step of generating, from input moving picture data, a thumbnail picture representing the moving picture data, as first thumbnail data, and for generating, from the moving picture data, a thumbnail picture of a picture extracted as a characteristic picture, or a thumbnail picture of a picture specified by a user, as a second thumbnail data, and a recording controlling step of exercising control for recording the first thumbnail data and the second thumbnail data, generated by the generating step as independent groups on a recording medium.

A program for a recording medium according to the present invention includes a generating step of generating, from input moving picture data, a thumbnail picture representing the moving picture data, as first thumbnail data, and for generating, from the moving picture data, a thumbnail picture of a picture extracted as a characteristic picture, or a thumbnail picture of a picture specified by a user, as a second thumbnail data, and a recording controlling step of exercising control for recording the first thumbnail data and the second thumbnail data, generated by the generating step as independent groups on a recording medium.

A program according to the present invention has a computer execute a generating step of generating, from input moving picture data, a thumbnail picture representing the moving picture data, as first thumbnail data, and for generating, from the moving picture data, a thumbnail picture of a picture extracted as a characteristic picture, or a thumbnail picture of a picture specified by a user, as a second thumbnail data, and a recording controlling step of recording the first thumbnail data and the second thumbnail data, generated by the generating step as independent groups on a recording medium.

A reproducing apparatus according to the present invention includes first readout means for reading out management data supervising picture data of a thumbnail picture representing the contents of the picture data in case playback of the picture data is commanded, second readout means for reading out the picture data based on the management data read out by the readout means, third readout means for reading out picture data of a thumbnail picture of a picture extracted as a characteristic picture from the picture data or picture data of a thumbnail picture of a picture specified by a user, and management data supervising the picture data, and fourth readout means for reading out the picture data based on the management data read out from the third readout means.

A reproducing method according to the present invention includes a first readout controlling step of reading out management data supervising picture data of a thumbnail picture representing the contents of the picture data in case playback of the picture data is commanded, a second readout controlling step of controlling the readout of the picture data based on the management data readout-controlled by the processing of the first readout control means, a third readout controlling step of reading out picture data of a thumbnail picture of a picture extracted as a characteristic picture from the picture data or picture data of a thumbnail picture of a picture specified by a user, and management data supervising the picture data, and a fourth readout controlling step of reading out the picture data based on the management data readout-controlled by the processing of the third readout control step.

A program for a recording medium according to the present invention includes a first readout controlling step of controlling the readout of management data supervising picture data of a thumbnail picture representing the contents of the picture data in case playback of the picture data is commanded, a second readout controlling step of controlling the readout of the picture data based on the management data readout-controlled by the processing of the first readout control means, a third readout controlling step of reading out picture data of a thumbnail picture of a picture extracted as a characteristic picture from the picture data or picture data of a thumbnail picture of a picture specified by a user, and management data supervising the picture data, and a fourth readout controlling step of reading out the picture data based on the management data readout-controlled by the processing of the third readout controlling step.

A program according to the present invention includes a first readout controlling step of controlling the readout of management data supervising picture data of a thumbnail picture representing the contents of the picture data in case playback of the picture data is commanded, a second readout controlling step of controlling the readout of the picture data based on the management data readout-controlled by the processing of the first readout control means, a third readout controlling step of reading out picture data of a thumbnail picture of a picture extracted as a characteristic picture from the picture data or picture data of a thumbnail picture of a picture specified by a user, and management data supervising the picture data, and a fourth readout controlling step of reading out the picture data based on the management data readout-controlled by the processing of the third readout control step.

A recording medium according to the present invention has, recorded thereon, first data comprised of picture data, thumbnail picture data of a thumbnail picture extracted from the picture data, indicating the contents of the picture data, and management data for supervising data of the thumbnail picture, and second data comprised of thumbnail picture data of a thumbnail picture of a picture extracted as a characteristic picture from the first stated picture data or picture data of a thumbnail picture of a picture specified by the user and management data supervising the picture data.

With the recording method and apparatus and the first program of the present invention, a thumbnail picture representative of input moving picture data is generated from the input moving picture data, as a first thumbnail data, whilst a thumbnail picture of a picture extracted as being a characteristic picture from the moving picture data or a thumbnail picture of a picture specified by the user is generated as second thumbnail data. The first and second thumbnail data are recorded as separate independent groups on the recording medium.

With the reproducing method and apparatus and the second program according to the present invention, if playback of an AV stream is commanded, management data supervising picture data of a thumbnail picture representing the contents of the AV stream is read out, whilst picture data is read out based on the management data read out by readout means. From the AV stream, picture data of a thumbnail picture of a picture extracted from it as a characteristic picture, or picture data of a thumbnail picture of a picture specified by a user, and management data supervising the picture data, are read out, and the picture data are read out based on the read-out management data.

Other objects, features and advantages of the present invention will become more apparent from reading the embodiments of the present invention as shown in the drawings.

BRIEF DESCRIPTION OF THE DRAWINGS

FIG. 5 shows info.dvr.
FIG. 6 illustrates DVRVolume( ).
FIG. 7 illustrates UIAppInfo Volume( ).
FIG. 8 illustrates TableOf PlayList( ).
FIG. 9 illustrates UIAppInfo PlayList( ).
FIG. 10 illustrates zzzzz.clip.
FIG. 11 illustrates ClipMark( ).
FIG. 13 illustrates xxxxx.rpls and yyyyy.vpls.
FIG. 14 illustrates PlayList( ).

FIG. 15 illustrates PlayItem( ).
FIG. 16 illustrates PlayListMark( ).
FIG. 21 illustrates menu_thmb/mark.thmb.
FIG. 22 illustrates Thumbnail( ).
FIG. 23 illustrates thumbnail_picture_format.
FIGS. 24A and 24B illustrate a method for storing thumbnail picture data in tn_block( ).
FIG. 26 illustrates menu_thmb/mark.thmb associated with the file structure shown in FIG. 25.
FIG. 27 illustrates TableOfPlayList( ) associated with the file structure shown in FIG. 25.
FIG. 28 illustrates PlayList( ) associated with the file structure shown in FIG. 25.
FIG. 29 illustrates UIAppInfo PlayList( ) associated with the file structure shown in FIG. 25.
FIG. 33 shows the syntax of the thumbnail header information
FIG. 34 illustrates display_aspect_ratio.
FIG. 35 illustrates color_space.
FIG. 36 shows the syntax of a thumbnail picture data file.

BEST MODE FOR CARRYING OUT THE INVENTION

Figure 1:
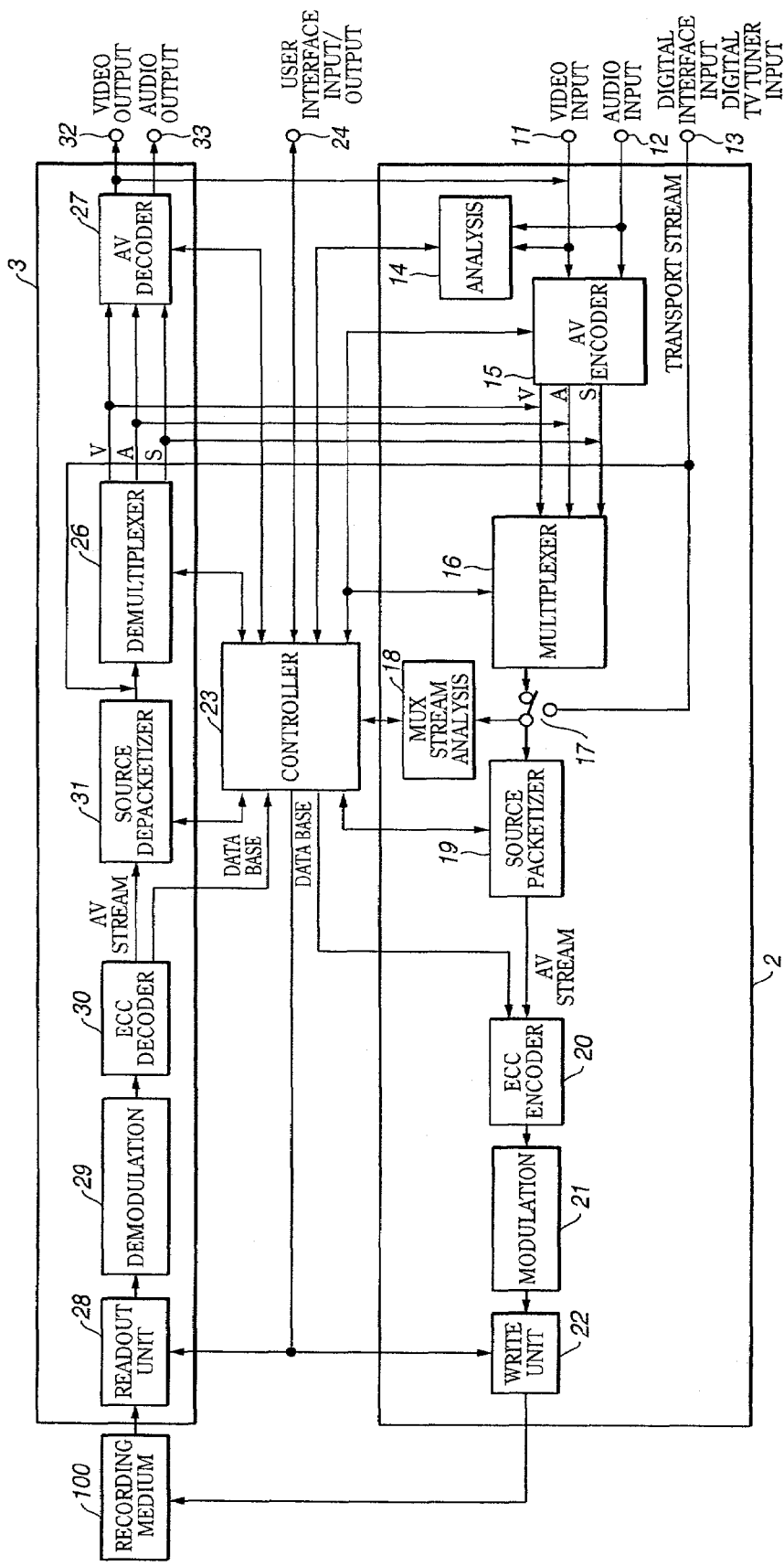
FIG. 1 shows a configuration of a recording and/or reproducing apparatus according to the present invention.

Referring to the drawings, a recording method and apparatus, a reproducing method and apparatus, a recording medium and a program, according to the present invention, will be explained in detail. FIG. 1 shows a typical illustrative structure of a recording and/or reproducing apparatus 1 embodying the present invention. First, the portion of the structure responsible for recording externally input signals on a recording medium is explained. The recording and/or reproducing apparatus 1 is able to be fed with and record analog or digital data.

Analog video signals and analog audio signals are fed to terminals 11, 12, respectively. The video signals input to the terminal 11 are output to an analysis unit 14 and to an AV encoder 15. The audio signals input to the terminal 12 are output to the analysis unit 14 and to the AV encoder 15. The audio signals fed to the terminal 12 are output only to the AV encoder 15. The analysis unit 14 extracts feature points, such as scene changes, from the input video signals.

The AV encoder 15 encodes input video and audio signal to output the system information (S), such as an encoded video stream (V), an encoded audio stream (A) and AV synchronization, to a multiplexer 16.

The encoded video stream is a video stream encoded e.g., with the MPEG (Moving Picture Expert Group) 2 system, whilst the encoded audio stream is an audio stream encoded in accordance with the MPEG1 system. The encoded audio stream is e.g., an audio stream encoded in e.g., the MPEG1 system or an audio stream encoded in accordance with the Dolby AC3 (trademark) system. The multiplexer 16 multiplexes the input video and audio streams, based on the input system information, to output a multiplexed stream through a switch 17 to a multiplexed stream analysis unit 18 and to a source packetizer 19.

The multiplexed stream is e.g., an MPEG-2 transport stream or an MPEG2 program stream. The source packetizer 19 encodes the input multiplexed stream into an AV stream composed of source packets in accordance with an application format of a recording medium 100 on which to record the stream. The AV stream is processed in ECC (error correction and coding) unit 20 and a modulation unit 21 with appendage of ECC codes and with modulation, before being output to a write unit 22, which then writes (records) an AV stream file based on a control signal output by the controller 23.

The transport stream, such as digital television broadcast, input from a digital interface or a digital television tuner, is input to a terminal 13. There are two recording systems for recording the transport stream, input to the terminal 13, one being a transparent recording system and the other being a system in which recording is preceded by re-encoding aimed at e.g., lowering the recording bit rate. The recording system designating information is input from a terminal 24 as a user interface to a controller 23.

In the transparent recording of the input transport stream, a transport stream, input to a terminal 13, is output to a multiplexed stream analysis unit 18 and to the source packetizer 19. The ensuing processing of recording an AV stream on a recording medium is the same as that of encoding and recording input audio and video signals, as described above, and hence is not explained here for simplicity.

If the input transport stream is re-encoded and subsequently recorded, the transport stream, input to the terminal 13, is input to a demultiplexer 26. The demultiplexer 26 demultiplexes the input transport stream to extract the video stream (V), the audio stream (A) and the system information (S).

Of the stream (information) extracted by the demultiplexer 26, the video stream is output to the AV decoder 27, while the audio stream and the system information are output to the multiplexer 16. The AV decoder 27 decodes the input video stream to output the reproduced video stream to the AV encoder 15, which then outputs the encoded video stream V to the multiplexer 16.

On the other hand, the audio stream and the system information, output from the demultiplexer 26 and input to the multiplexer 16, are multiplexed, based on the input system information, and output as a multiplexed stream to the multiplexed stream analysis unit 18 and to the source packetizer 19 through switch 17. The ensuing processing until recording of the AV stream on the recording medium 100 is similar to that of encoding and recording the video signals and hence is not explained specifically.

The recording and/or reproducing apparatus 1 of the present embodiment records a file of the AV stream on the recording medium 100, while also recording the application database information which accounts for the file. The application database information is prepared by the controller 23. The input information to the controller 23 is the feature information for the moving picture from the analysis unit 14, the feature information of the AV stream from the multiplexed stream analysis unit 18 and the user command information input at a terminal 24.

The feature information of the moving picture, supplied from the analysis unit 14, is the information pertinent to a picture characteristic of the input moving picture signals, and may, for example, include the specifying information (marks), such as a program start point, a scene change point or start and end points of the commercial (CM), or the thumbnail picture information of a picture of the specified site.

The feature information of the AV stream from the multiplexed stream analysis unit 18 is the information pertinent to the encoding information of the AV stream for recording, such as the address information of an I-picture in an AV stream, encoding parameters of the AV stream, transition point information of the encoding parameters in the AV stream, or the information pertinent to characteristic pictures in a video stream (marks).

The specifying information of the user from terminal 24 is the information in the AV stream, such as the specifying information of the playback domain as specified by the user, character letters which account for the contents of the playback domain or the bookmarks or resuming points for the user to set his or her favorite scene.

Based on the aforementioned input information, the controller 23 creates a database of the AV stream (Clip), a database of a group (PlayList) of playback domains (PlayItem) of the AV stream, management information of the recorded contents of the recording medium 100 (info.dvr) and the information on thumbnail pictures. Similarly to the AV stream, the application database information, constructed from the above information, is processed in the ECC unit 20 and the modulation unit 21 and input to the write unit 22, which then records a database file on the recording medium 100.

The above-described application database information will be explained subsequently in detail.

When the AV stream file recorded on the recording medium 100 (files of picture data and speech data) and the application database information, thus recorded on the recording medium 100, are reproduced, the controller 23 first commands a readout unit 28 to read out the application database information from the recording medium 100. The readout unit 28 reads out the application database information from the recording medium 100, which then reads out the application database information from the recording medium 100 to send the application database information through demodulation and error correction processing by a demodulating unit 29 and an ECC decoder 30 to the controller 23.

Based on the application database information, the controller 23 outputs a list of PlayList recorded on the recording medium 100 to a user interface of the terminal 24. The user selects the PlayList, desired to be reproduced, from the list of PlayLists. The information pertinent to PlayList, specified to be reproduced, is input to the controller 23. The controller 23 commands the readout unit 28 to read out the AV stream file necessary in reproducing the PlayList. In accordance with the command, the readout unit 28 reads out the corresponding AV stream from the recording medium 100 to output the read-out AV stream to the demodulating unit 29. The AV stream, thus input to the demodulating unit 29, is demodulated by preset processing and output through the processing by the ECC decoder 30 to the source packetizer 19.

The source depacketizer 31 converts the AV stream of the application format, read out from the recording medium 100 and processed in a preset fashion, into a stream that can be output to the demultiplexer 26. The demultiplexer 26 outputs the system information (S), such as the video stream (V), audio stream (A) or the AV synchronization, forming the playback domain (PlayItem) of the AV stream specified by the controller 23, to the AV decoder 27, which AV decoder 27 decodes the video stream and the audio stream to output the playback video signal and the playback audio signal to associated terminals 32, 33, respectively.

If fed from the terminal 24, as a user interface, with the information instructing random access playback or special playback, the controller 23 determines the readout position of the AV stream from the recording medium 100, based on the contents of the database (Clip) of the AV stream, to command the readout unit 28 to read out the AV stream. If the PlayList as selected by the user is to be reproduced as from a preset time point, the controller 23 commands the readout unit 28 to read out data from an I-picture having a time stamp closest to the specified time point.

If the user has commanded fast forward playback, the controller 23 commands the readout unit 28 to sequentially read out I-picture data in the AV stream in succession based on the database (Clip) of the AV stream.

The readout unit 28 reads out data of the AV stream from a specified random access point. The so read-out data is reproduced through processing by various components on the downstream side.

The case in which the user edits the AV stream recorded on the recording medium 100 is now explained. If desired to specify a playback domain for the AV stream recorded on the recording medium 100, for example, if desired to create a playback route of reproducing a portion sung by a singer A from a song program A, and subsequently reproducing a portion sung by the same singer A from another song program B, the information pertinent to a beginning point (IN-point) and an end point (OUT-point) of the playback domain is input to the controller 23 from the terminal as a user interface. The controller 23 creates a database of the group (PlayList) of playback domains (PlayItem) of the AV streams.

When the user desires to erase a portion of the AV stream recorded on the recording medium 100, the information pertinent to the IN-point and the OUT-point of the erasure domain is input to the controller 23, which controller 23 then modifies the database of the PlayList so as to refer to only the needed AV streams. The controller 23 also commands the write unit 22 to erase an unneeded stream portion of the AV stream.

The case in which the user desires to specify playback domains of an AV stream recorded on the recording medium 100 to create a new playback route, and to interconnect the respective playback domains in a seamless fashion, is now explained. In such case, the controller 23 creates a database of a group (PlayList) of the playback domains (PlayItem) of the AV stream and undertakes to partially re-encode and re-multiplex the video stream in the vicinity of junction points of the playback domains.

The picture information at the IN-point and that at the OUT-point of a playback domain are input from a terminal 24 to a controller 23. The controller 23 commands the readout unit 28 to read out data needed to reproduce the pictures at the IN-point and at the OUT-point. The readout unit 28 reads out data from the recording medium 100. The data so read out is output through the demodulating unit 29, ECC decoder 30 and the source depacketizer 31 to the demultiplexer 26.

The controller 23 analyzes data input to the demultiplexer 26 to determine the re-encoding method for the video stream (change of picture_coding_type and assignment of the quantity of encoding bits for re-encoding) and the re-multiplexing system to send the system to the AV encoder 15 and to the multiplexer 16.

The demultiplexer 26 then separates the input stream into the video stream (V), audio stream (A) and the system information (S). The video stream may be classed into data input to the audio decoder 27 and data input to the multiplexer 16. The former is data needed for re-encoding, and is decoded by the AV decoder 27, with the decoded picture being then re-encoded by the AV encoder 15 and thereby caused to become a video stream. The latter data is data copied from an original stream without re-encoding. The audio stream and the system information are directly input to the multiplexer 16.

The multiplexer 16 multiplexes an input stream, based on the information input from the controller 23, to output a multiplexed stream, which is processed by the ECC unit 20 and the modulation unit 21 so as to be sent to the write unit 22. The write unit 22 records an AV stream on the recording medium 100 based on the control signals supplied from the controller 23.

Data recorded on the recording medium 100 in such recording and/or reproducing apparatus 1 (data reproduced from the recording medium 100) is reproduced. Such data obtained on causing a bitstream, encoded in accordance with an encoding system, such as the MPEG Video or MPEG Audio, and multiplexed in accordance with the MPEG-2 system, to become a file handled by a file system, and on recording the file on a disc, is termed an AV (audio video) stream file or a Clip AV stream.

The scheme of specifying such AV stream file partially or entirely, arraying the specified portion for playback, by way of specifying the playback sequence, is hereinafter explained. The playback sequence delineation of specifying the AV stream file partially or entirely and of reproducing only the necessary portions is the PlayList. The PlayList is a self-contained unit in the user's perspective. The simplest structure is a unit from the start of recording until the end of recording. Lacking the editing, this unit becomes one PlayList.

The PlayList is comprised of designation of the AV stream file to be reproduced and a set of a playback beginning point (IN-point) and a playback end point (OUT-point). A set of the AV stream file, playback start point and the playback end point is termed the PlayItem. Thus, the PlayList is a set of PlayItems.

Figure 2:
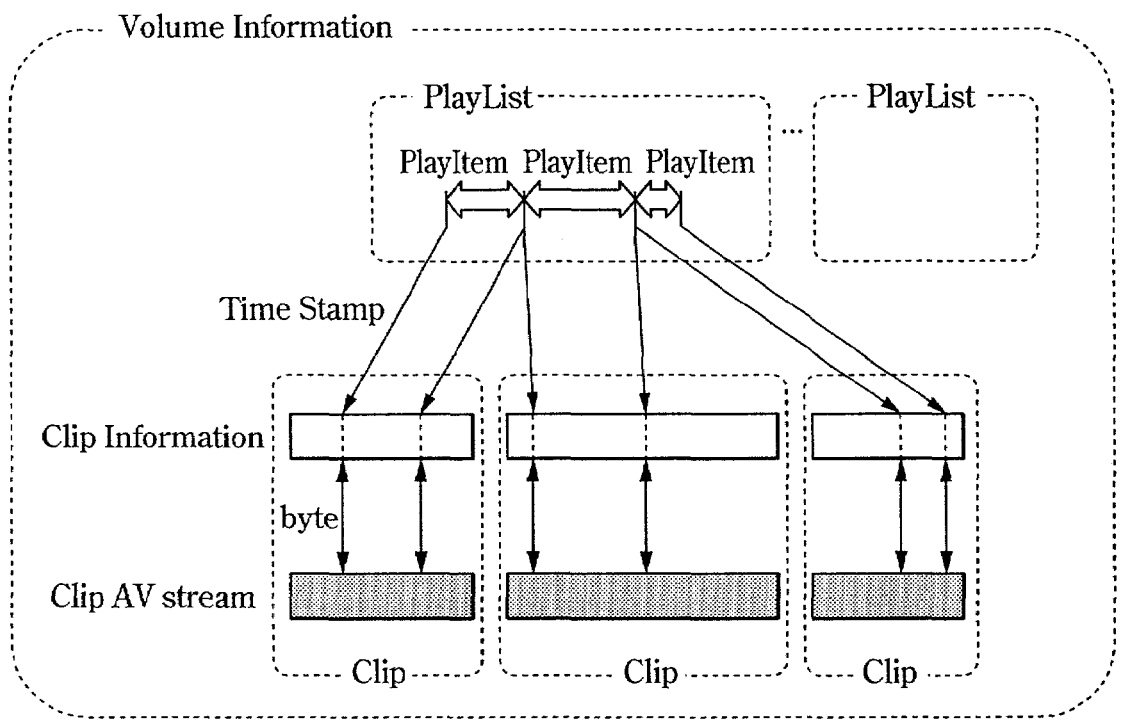
FIG. 2 shows the relation between Clip and PlayList.

Referring to FIG. 2, the PlayItem references a range specified by IN-point and OUT-point of a given AV stream. Reproducing a PlayItem is tantamount to reproduction of a portion of the AV stream referenced by the PlayItem.

While the AV stream is a bitstream multiplexed e.g., in the form of the MPEG-TS, the information having the relation of one-for-one correspondence (clip information) is held in a file distinct from the file in which the AV stream is recorded. This clip information is provided to facilitate reproduction and editing. This clip information and the AV stream is treated as one unit (object) and is termed a Clip. That is, the Clip is an object made up of the AV stream file and the ancillary information.

Figure 3:
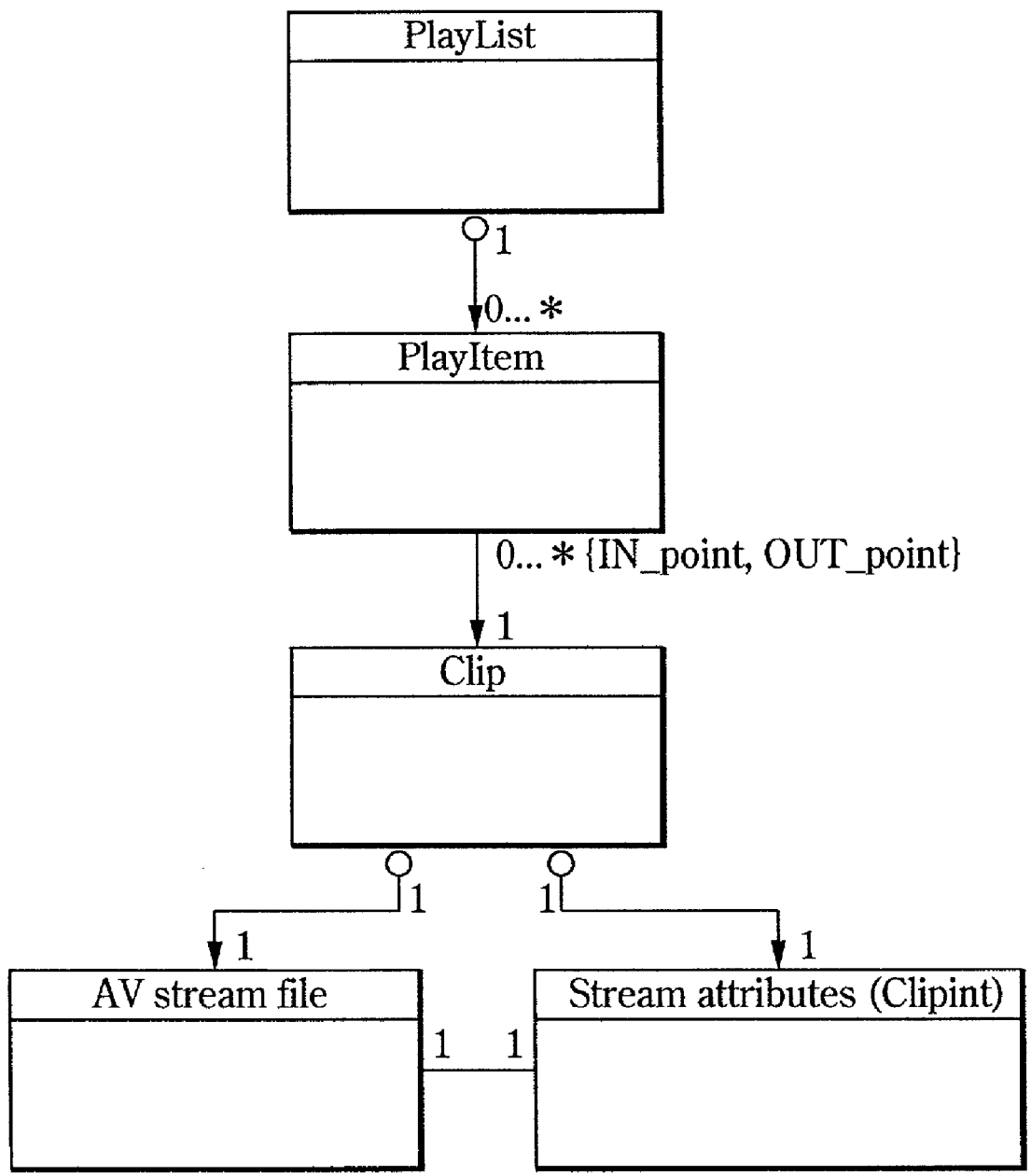
FIG. 3 is a UML doagram of a structure supervising an AV stream.

FIG. 3 shows the above-described relation in the form of a UML diagram. The structure of the AV stream file, Clip, PlayItem and PlayList, represented by the UML diagram of FIG. 3, renders possible the non-destructive playback sequence of reproducing only optional portions without modifying the AV stream file.

The file arrangement on a recording medium for recording or reproducing variable information for realization of the present invention is now explained. On the recording medium are recorded five sorts of files, namely info,dvr, menu.thmb (mark.thmb), #####.rpls (#####.vpls), where ##### denotes an optional number, %%%%%.cpli, where %%%%% denotes an optional number, and %%%%%.clpi, where %%%%% is such a number which causes each m2ts file to bear a one-for-one correspondence with the cpli file.

A directory /DVR is provided on a disc, so that a range underlying this directory is a range supervised by one disc respective system. It is noted that /DVR may be in a root directory of a disc or below a preset directory. In the /DVR directory are put info.dvr, menu.thmb and mark.thmb files.

Below /DVR are put /PLAYLIST, /CLIPINF and /M2TS. The files #####.rpls and #####.vpls are put below /PLAYLIST, whilst %%%%%.clpi and %%%%%.m2ts are put in the /CLIPINF and /M2TS, respectively.

A sole file, that is a file info.dvr, is put below /DVR. The structure of info.dvr is represented by a syntax shown in FIG. 5. The inside of a file is made up of blocks from one functional information to another, such that the information pertinent to the volume, the information pertinent to the arraying of the PlayLists and the information proper to the maker of the recording and/or reproducing apparatus 1 are stored in the DVR Volume( ), TableOfPlayList( ) and in the MakersPrivateData( ), respectively. In a leading end of a file are stated addresses indicating the leading ends of the respective blocks. For example, TableOfPlayList_Start_address indicates the position of beginning of TableOfPlayLists( ) in terms of the relative number of bytes in the file.

The structure of DVRVolume( ) is represented by the syntax shown in FIG. 6. The version_number and length represent the version number of DVRVolume( ) and the length in bytes from a field directly following the length to the trailing end of the DVRVolume( ). ResumeVolume( ) is an area in which to store the information pertinent to resuming, whereas UIAppInfoVolume( ) is an area in which to store the attribute information of Volume.

FIG. 7 shows the syntax of UIAppInfoVolume( ). The character_set indicates the method of encoding character letters encoded in the Volume_name field. The encoding method may be selected from ASCII, Unicode and so forth. The name_length denotes the length of bytes of the volume (disc) name indicated in the Volume_name field. The Volume_name denotes the name of the volume (disc). The number of bytes of the number of name_length from left of the field is the effective character letter indicating the name of the volume (disc).

In the Volume_name field, the values following these effective character letters are optional. The Volume_protect_flag is a flag indicating whether or not the contents in the volume may be presented to the user for viewing without limitations. If 1 is set in this flag, the user may view the contents of the volume only if the user has succeeded in inputting the correct PIN number (PIN in FIG. 7). If the flag is set to 0, the user may view the contents of the volume even if the user does not input the PIN number. If, when the user has inserted a disc into a player (recording and/or reproducing apparatus 1), the flag is set to 0, or the flag is set to 1 but the user has succeeded in correctly entering the PIN number, the player demonstrates a list in the PlayList in the so set disc.

The foregoing is directed to playback limitations imposed on the Volume. The playback limitations on the respective PlayLists are irrelevant to the Volume_protect_flag and are indicated by the playback_control_flag defined in the UIAppInfoPlayList( ) of FIG. 9, as explained subsequently. PIN is four numerical figures of from 0 to 9, each of the four numerical figures being encoded in accordance with the ISO/IEC 646. If there exists a thumbnail representative of the Volume, ref_thumbnail_index is an area in which to store the number used for identifying the thumbnail. The thumbnail in the menu and thmb files having a thumbnail_index specified by the ref_thumbnail_index becomes a menu thumbnail representing the Volume. In the present invention, thumbnails representing the Volume or PlayList are termed menu thumbnails.

The rp_info_valid_flag, if 1, indicates that next following rp_ref_to_Playlist_file_name, rp_ref_to_Playitem_id and rp_time_stamp are of valid values. The rp_ref_to_PlayList_file_name indicates that the menu thumbnail representing the Volume has been created from a picture extracted from the pictures of a preset PlayList, and indicates the name of the PlayList file.

The rp_ref_to_PlayItem_id indicates PlayItem_id indicating one PlayItem in the PlayList denoted by rp_ref_to_PlayList_file_name, and indicates that the menu thumbnail representative of the Volume is created from the picture extracted from the picture of the PlayItem. The rp_time_stamp indicates the presentation time stamp of a picture in the PlayItem indicated by the rp_ref_to_PlayTime_id, and denotes that the menu thumbnail representative of the Volume has been created from the picture.

FIG. 8 shows the syntax of TableOfPlayList( ). It is noted that the number_of_PlayLists indicates the number of PlayLists in the Volume, with the PlayList_file_name specifying a filename, such as #####.rpls or #####vpls. In the UIAppInfoPlayList( ) are written various attributes of the PlayList, with the syntax being as shown in FIG. 9. In the UIAppInfoPlayList( ), shown in FIG. 9, there are stored a variety of attribute information not directly necessary for playback of PlayList, such as PlayList name, recording date and time, recording time or erasure inhibition or allowance. Of these, ref_thumbnail_index is able to specify a thumbnail as a representative picture of the PlayList. That is, the thumbnail in the file menu.thmb, having the thumbnail_index specified by ref_thumbnail_index is the thumbnail representative of the PlayList.

If rp_info_valid_flag is 1, it indicates that the values of the next following rp_ref_to_PlayTime_id and rp_time_stamp are valid. On the other hand, rp_ref_to_PlayItem_id indicates the PlayItem_id specifying one PlayItem in the PlayList and denotes that the menu thumbnail representative of the PlayList is created from the picture extracted from the picture in the PlayItem, whereas rp_time_stamp indicates the presentation time stamp of a picture in the PlayItem specified by the rp_ref_to_Playitem_id and denotes that the menu thumbnail representative of the PlayList is created from the picture.

Figure 4:
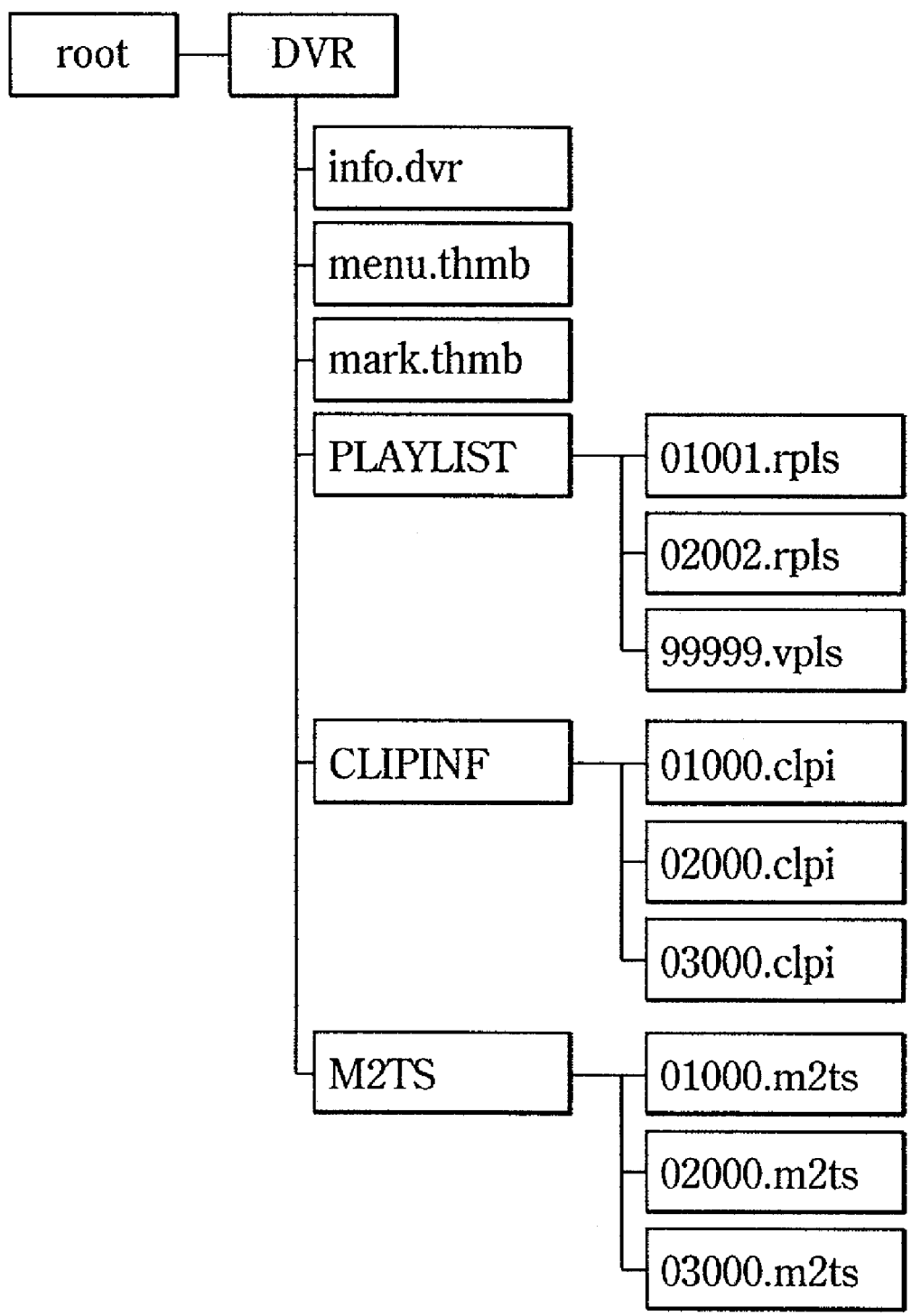
FIG. 4 shows a directory structure of a DVR system.

One file %%%%%.clpi shown in FIG. 4 is created below /CLIPINF in association with each AV stream file %%%%%.m2ts. The structure of %%%%%.clpi is shown in FIG. 10. The inside of the file is made up of blocks from one functional information to another. The information pertinent to Clip is stored in ClipInfo( ), the information pertinent to discontinuous points of PCR (program clock reference) representing time base of the transport stream in the MPEG-2 system is stored in STC_Info( ), the information pertinent to the program in the MPEG-2 system is stored in ProgramInfo( ), the information pertinent to CPI (Characteristic Point Information) representing feature points such as random access start point in the AV stream is stored in CPI( ) and the mark information such as index points or commercial start and end points affixed to the Clip is stored in ClipMark. In the leading end of the file are recorded addresses indicating the leading ends of the respective blocks.

Here, only the blocks relevant to thumbnails are explained. In the present embodiment, the operation of affixing the thumbnails to the clip is realized by affixing the thumbnails to the clip marks. The information of the marks affixed to the clips is stored in the ClipMark( ). FIG. 11 shows the syntax of the ClipMark( ). In the syntax, mark_type denotes mark types, such as resume, bookmark or skip, while mark_time_stamp indicates the time of affixing the mark. The field pertinent to the thumbnail is ref_thumbnail index. It is noted that ref thumbnail_index specifies the thumbnail number to specify the thumbnail in the mark.thmb file in which the thumbnail data is stored. The thumbnail specified by ref thumbnail_index becomes the mark thumbnail afforded to the mark. In the present invention, the thumbnail afforded to the mark is specifically termed a mark thumbnail.

Figure 12:
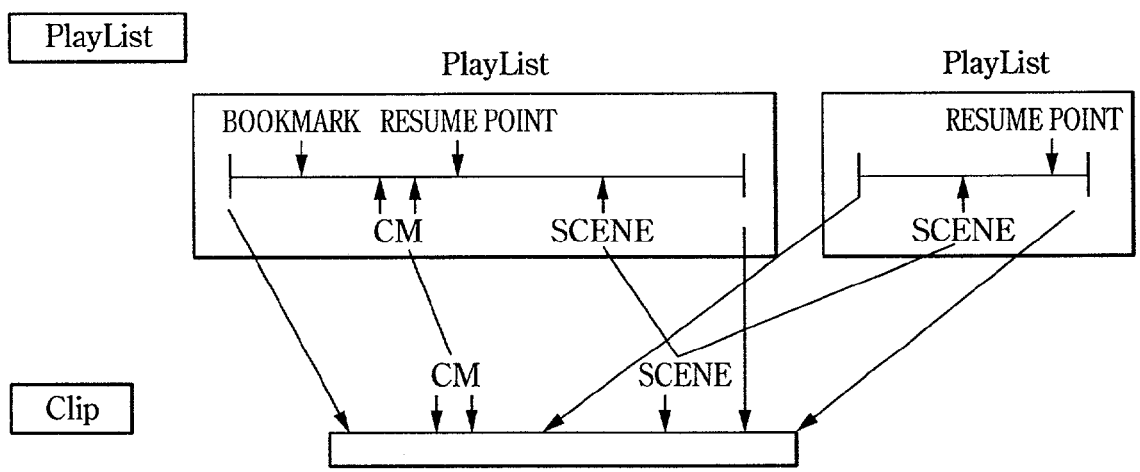
FIG. 12 illustrates Mark.
Figure 17:
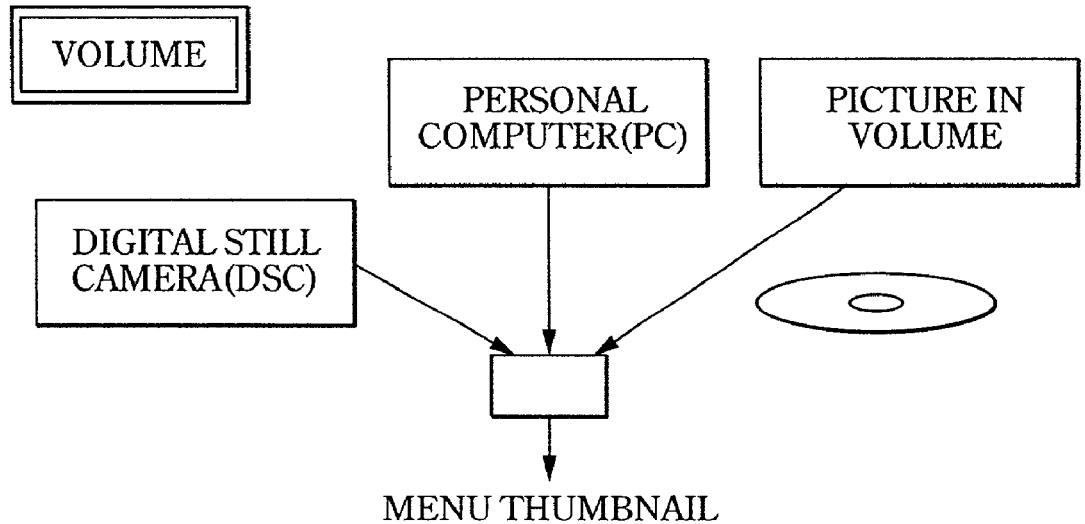
FIG. 17 illustrates a menu thumbnail.

The mark is mainly used to specify a highlight or a characteristic scene in the Clip and in the PlayList. The skip function of commanding skipping the playback as from the mark to reproduce the next PlayItem is also realized by the mark. FIG. 12 shows that the mark is accorded to the Clip and to the PlayList. The features of the mark are now summarized.

The mark added to the Clip specifies characteristic scenes attributable to the contents of the AV stream, for example, scene change points. In reproducing the PlayList, random access may be made using the mark in the Clip being referenced by the PlayList. In FIG. 12, two marks of commercial (CM) and scene are afforded to the Clip. The commercial mark is utilized from the lest PlayList, whilst the scene mark is utilized from two PlayLists. The marks added to the PlayList, such as bookmarks or resume points, are mainly set by the user. These are bookmark and resume points in FIG. 12.

The marks are set in the Clip or PlayList by adding the time stamp indicating the mark time point to the mark list. Mark deletion is tantamount to removing the time stamp of the mark from the mark list. Therefore, mark setting or deletion causes no changes in the AV stream.

The files #####.rpls and #####.vpls, shown in FIG. 4, are hereinafter explained. One of the files #####.rpls and #####.vpls is created under the /PLAYLIST for each PlayList. The structure of files #####.rpls and #####.vpls is shown in FIG. 13. The inside of the file is made up of blocks from one functional information to another. The information pertinent to PlayList is stored in PlayList( ), the information of the mark afforded to the PlayList is stored in the PlayListMark( ) and the information proper to the maker of the recording and/or reproducing apparatus having recorded the PlayList file is stored in the MakersPrivateData( ). In the leading end of the file are recorded addresses indicating the leading ends of blocks, such as PlayListMark_Start_address, So, padding_byte may be inserted ahead or at back of the block. However, the beginning position of the PlayList( ) is fixed and is set to e.g., 256th byte as from the leading end of the file.

The contents of the block PlayList( ) is shown in FIG. 14. First and foremost is version_number indicating the version number of the next following information. The length indicates the byte length as from the field directly following the length to the end of the PlayList( ). The PlayList_type indicates the sort of the PlayList and CPI_type denotes the type of the CPI owned by this PlayList. The number_of_PlayItems denotes the number of PlayItems forming the PlayList, while the number_of_SubPlayItems denotes the number of Playitems (SubPlayitem) for post recording afforded to the PlayList. The PlayItem( ) and the SubPlayItem( ) store the information of the Playitem and the information of the SubPlayitem, respectively.

The contents of the block PlayItem( ) are as shown in FIG. 15. In the Clip_Information_file_name, the filenames of the Clip information files (files having the extender clpi) referenced by the PlayItem are stored in the form of letter strings. STC_sequence_id indicates the domain of the time range with continues PCR. Since an integrated continuous time axis may be defined in this domain, the start and end points of the PlayItem can be determined uniquely. That is, the start and end points of the respective PlayItems must be present in the same STC sequence.

IN_time denotes pts (presentation time stamp) on the STC_sequence of the start point of this PlayItem, whilst OUT_time denotes the pts on the STC_sequence of the end point of the PlayItem. The connection_condition is the information indicating how this Playitem is coupled to the next Playitem and denotes the condition as to whether or not the neighboring Playitems can be reproduced seamlessly.

BridgeSequenceInfo( ) stores the information pertinent to a bitstream (bridge sequence) generated when skipping to a bitstream different from the bitstream to be inherently reproduced at a junction of the Playitems and reproducing this different bitstream to realize the function of reproducing the neighboring Playitems seamlessly. The program_number denotes a set of elementary streams, such as video or audio streams, defined in MPEG system, that is a channel in the television broadcast.

The above is the gist of the data structure forming the PlayList and the Playitem. With such data structure, it is possible to form the PlayList by an array of Playitems in the AV stream which are desired to be reproduced and which are specified by sets of IN and OUT points, while it is also possible to supervise a set of playback unit recognized by the user.

In the embodiment of the present invention, the operation of affixing a thumbnail at an optional time point on the PlayList is realized by affixing a thumbnail to the PlayList mark. The mark information affixed to the PlayList is stored in the PlayListMark( ). FIG. 16 shows the syntax of the PlayListMark( ). The mark_type in the syntax denotes the type of the mark, such as resume, bookmark and skip, while mark_time_stamp denotes the time the mark is assigned. The ref thumbnail index specifies the thumbnail number to specify the thumbnail in the mark.thmb file in which thumbnail data is stored. The thumbnail specified by ref_thumbnail_index becomes the mark thumbnail corresponding to the mark.

The thumbnail is explained in detail. The thumbnail denotes a still picture ancillary to Volumes, PlayList and Clip. There are two sorts of the thumbnail, one being a thumbnail representing the contents. This thumbnail is mainly used in a menu picture in order to permit the user to select the picture desired to be viewed using a cursor. The other is a picture representing a scene pointed by the mark.

The Volume and each PlayList need to be able to have respective representative pictures. The representative picture of the Volume is presupposed to be used for such a case wherein a still picture indicating the disc contents are displayed first. The representative picture of the PlayList is presupposed to be used as a still picture for demonstrating the PlayList contents in the menu picture used in selecting the PlayList.

The simplest method of realizing the representative picture of the PlayList is to render the first picture of the PlayList a thumbnail. However, the leading picture at the playback time 0 is not necessarily optimum in representing the contents. So, an optional picture is adapted for being determined as a thumbnail on the PlayList. The above two thumbnails are termed menu thumbnails. The menu thumbnails are demonstrated frequently and hence need to be able to be read out speedily from the disc. For satisfying the need, all menu thumbnails are stored in one file for the sake of efficiency. The menu thumbnails are not necessarily the pictures extracted from the moving pictures in the volume, but may be pictures captured from the personal computer or from a digital still camera.

Figure 18:
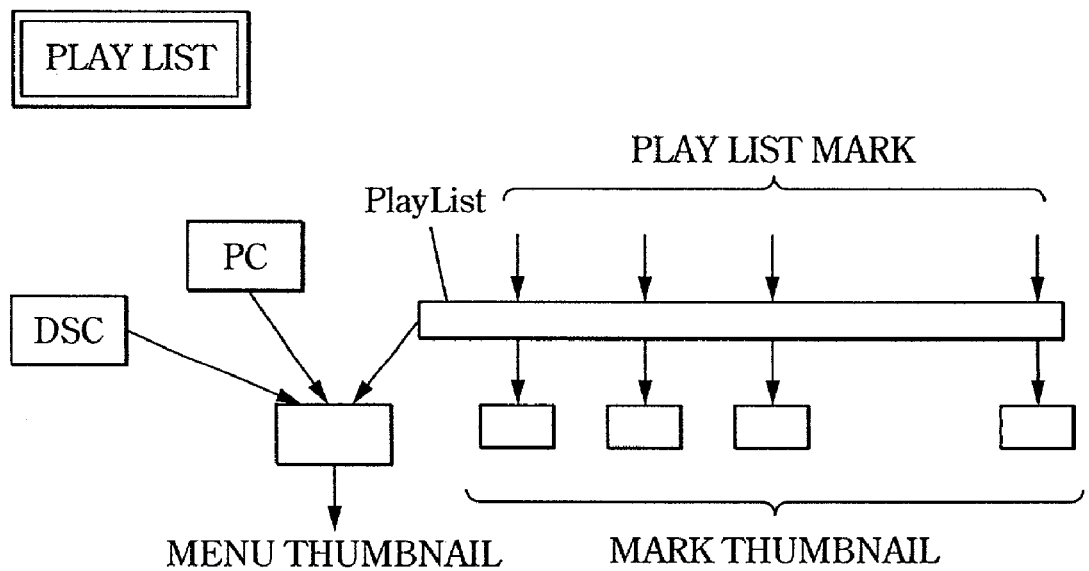
FIG. 18 illustrates a mark affixed to PlayList.
Figure 19:
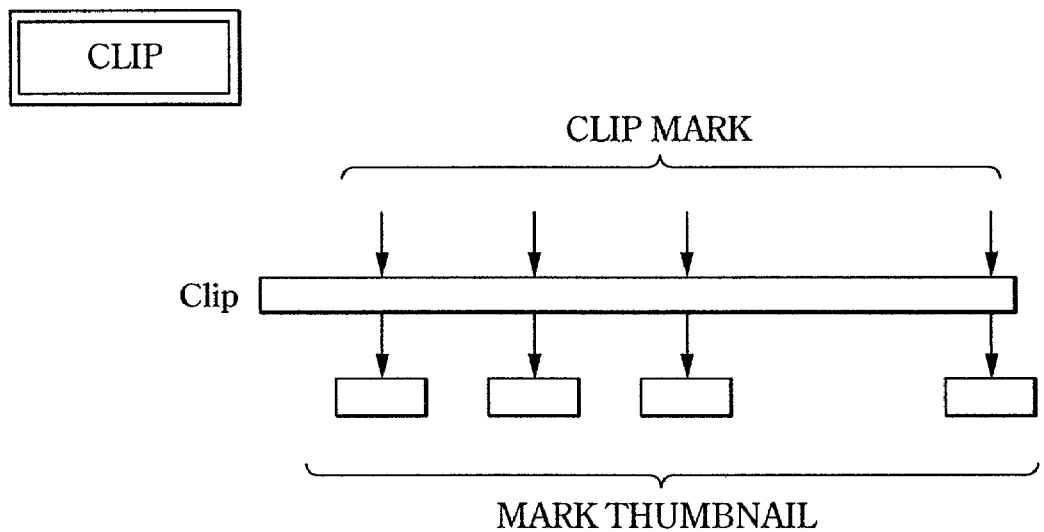
FIG. 19 illustrates a mark affixed to the PlayList.

On the other hand, it is necessary that plural marks can be entered in the Clip and PlayList and that, for grasping the contents of the mark positions, the mark point pictures need to be able to be viewed easily. The pictures indicating these mark points are termed mark thumbnails. So, the thumbnails are derived mainly form the extracted mark point pictures, rather than the pictures captured from outside, as shown in FIGS. 18 and 19. In distinction from the menu thumbnails, the mark thumbnails are used e.g., in a submenu used for representing details of the PlayList, and hence need not be read out in short access time.

Figure 20:
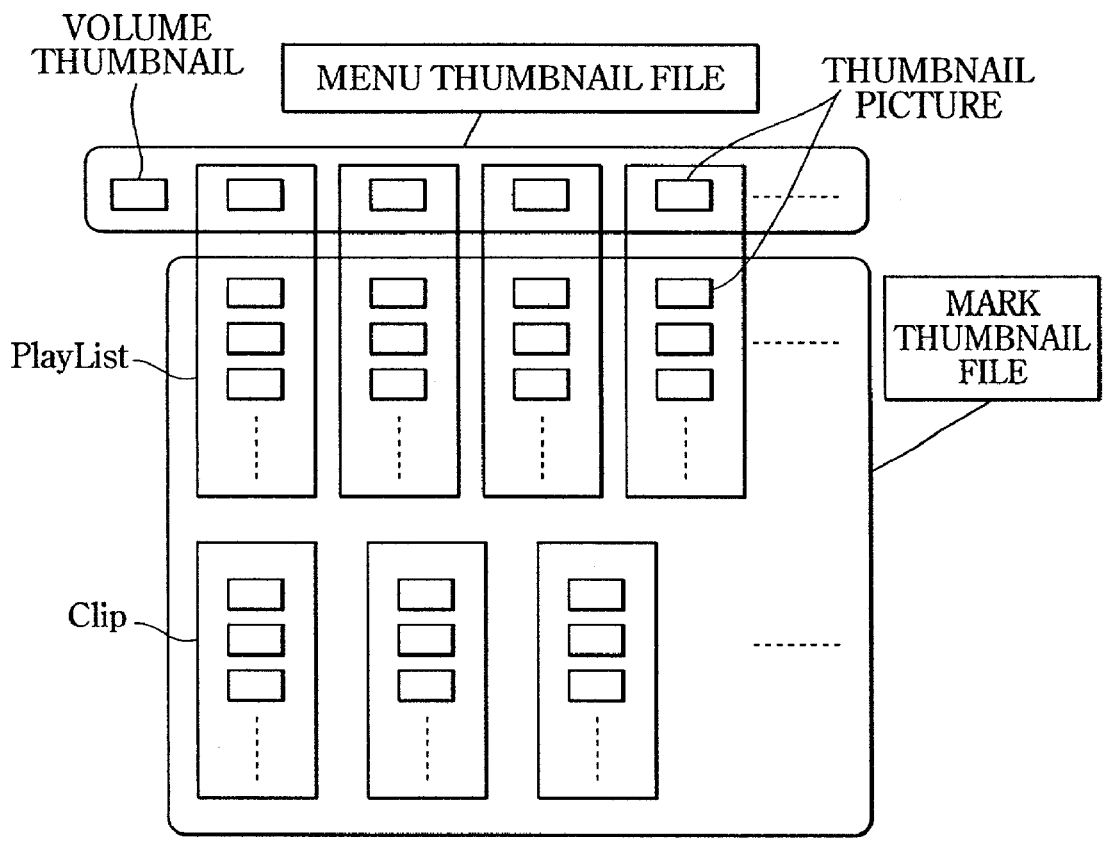
FIG. 20 illustrates a file in which to store a thumbnail.

So, there is no problem if the operation of the player opening a file to read out a portion of the file each time a thumbnail is necessary is somewhat time-consuming. For decreasing the number of files present in the volume, all mark thumbnails are desirably stored in one file. Although the PlayList may have one menu thumbnail and plural mark thumbnails, the Clip need not be selected directly by the user (it is usually specified through PlayList) so that it does not have the menu thumbnail. FIG. 20 shows the above-described relation.

Since the thumbnails are added and deleted every so often, the operations of addition and partial deletion need to be executed readily and speedily. For this reason, the Thumbnail( ) has a block structure. Picture data are divided into plural portions each of which is stored in one tn_block( ). One picture data is stored in continuous tn_block( ). There may exist tn_block( ) not in used in the string of the tn_block( ). The byte length of one thumbnail picture is variable.

FIG. 21 shows a syntax of the file which stores thumbnail data. In this file, there exists only one Thumbnail( ). FIG. 22 shows the syntax of thumbnail( ). The version_number denotes four character letters indicating the version number of this thumbnail( ). The length is a 32-bit unsigned integer indicating the number of bytes of thumbnail( ), whilst tu_blocks_start_address is a 32-bit unsigned integer indicating the start byte address as from the leading end of thumbnail( ).

The number_of_thumbnails is a 16-bit unsigned integer indicating the number of thumbnail pictures stored in this thumbnail( ). The tu_blocks_start_address is a 16 bit unsigned integer representing the size of 1 tn_block( ) in kilobytes. For example, the tu_blocks_start_address being 1 indicates that the size of one tn_block( ) is 1024 bytes. The number_of_tu_blocks is a 16-bit unsigned integer indicating the number of the tn_block( ) in this thumbnail( ).

The thumbnail_index is a 16-bit unsigned integer indicating an index number of a thumbnail represented by the thumbnail information for one for-loop beginning from this thumbnail_index field. The value of 0xFFFF must not be used for thumbnail_index. The thumbnail_index is referenced by ref_thumbnail_index. The thumbnail_picture_format is an 8-bit unsigned integer indicating a picture format of a thumbnail picture and assumes a value shown in FIG. 23. The DCF (Design Rule for camera File System) and the PNG (Portable Network Graphics) are allowed only within "menu.thmb". That is, the mark thumbnail must assume a value "0x00" (MPEG-2 Video I-picture).

The picture_data_size is a 32-bit unsigned integer indicating the byte length of an encoded thumbnail picture, while the start_tn_block_number is a 16-bit unsigned integer indicating the tn_block_number of tn_blocks with which begins data of a thumbnail picture. The leading end of thumbnail picture data must coincide with the leading end of tb_block. The start_tn_block_number begins with 0 and is relevant to the number of a variable k in the tn_block for-loop. The x_picture_length is a 16-bit unsigned integer indicating the number of pixels in the horizontal direction of the thumbnail picture.

The y_picture_length is a 16-bit unsigned integer indicating the number of pixels in the vertical direction of the thumbnail picture. The tu_block is an area in which to store picture data. All of tn_blocks( ) in the thumbnail( ) must be of the same size prescribed in tn_block_size. FIGS. 24A and 24B schematically indicate the manner in which the picture data are stored in the tn_block. As shown in FIGS. 24A and 24B, each picture data begins at the leading end of tn_block( ). If a picture data is of a size exceeding one tn_block( ), it is stored by exploiting the next following tn_block( ).

Although picture data is of variable length, one tn_block( ) is of a fixed size. By converting the variable length data into fixed length data, addition of new picture data or deletion of picture data can be dealt with on the block basis, thus simplifying address management.

Figure 25:
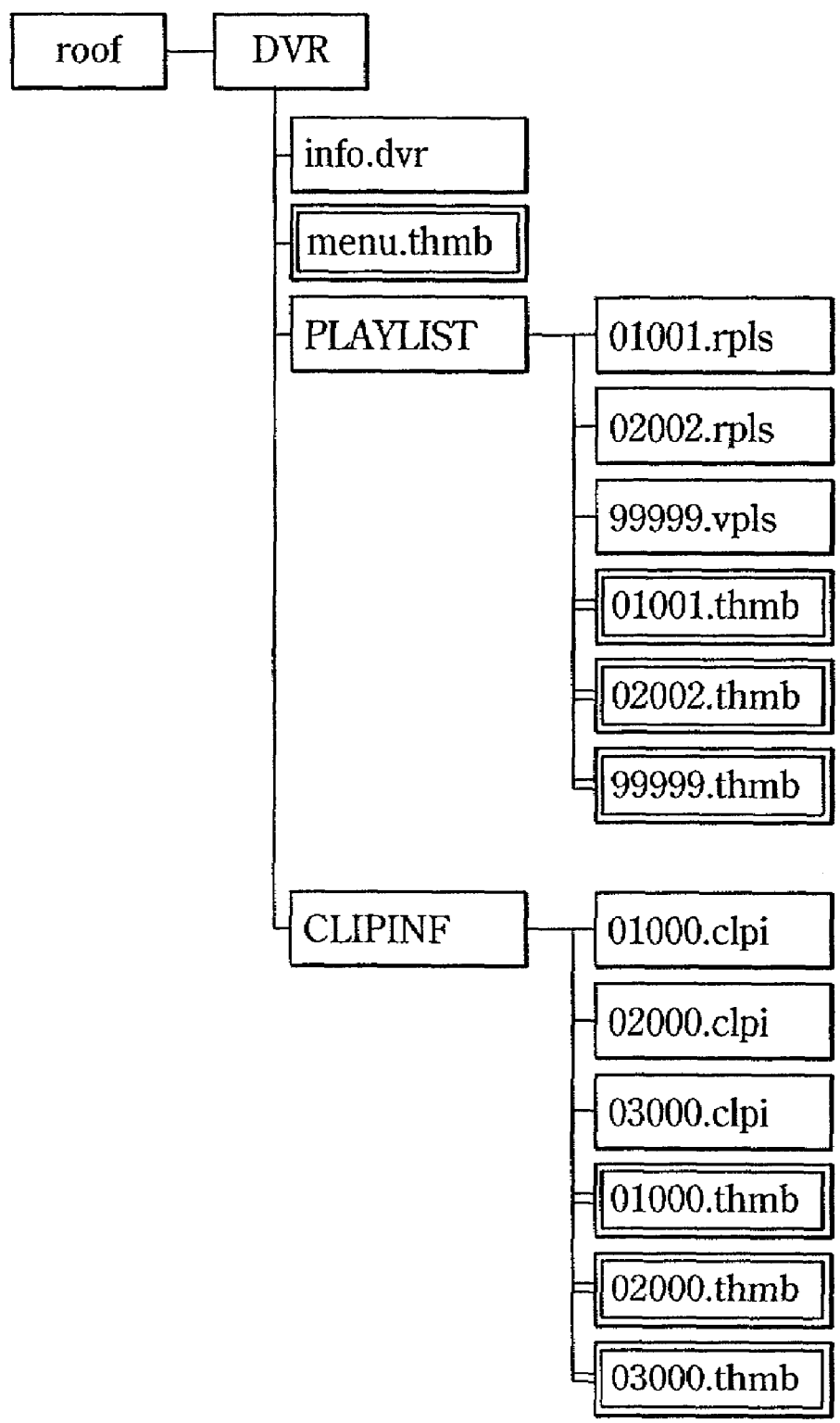
FIG. 25 illustrates another directory file structure.

An alternative proposal of the directory file structure and the syntax for thumbnail recording is hereinafter explained. An alternative proposal of the directory file structure shown in FIG. 4 is shown in FIG. 25. In FIG. 4, there is only one file for recording a mark thumbnail, namely mark.thmb, below /DVR. In FIG. 25, plural files xxxxx.thmb are provided in a one-for-one correspondence for each PlayList and Clip (xxxxx is a filename, excluding an extender, representing an associated PlayList or Clip).

For example, the mark thumbnail picture, owned by the PlayList represented by #####.rpls, is stored in #####.thmb in the same directory. Similarly, the picture of the mark thumbnail owned by the Clip represented by %%%%%.clpi, is stored in %%%%%.thmb in the same directory. The mark thumbnail of the PlayList clip is subjected to the constraint that it is stored in the thumb file having the same name portion except the file extender, with the syntax in the xxxxx.thmb being the same as menu.thmb or mark.thmb (Fig.21), as shown in FIG. 26.

As for the menu thumbnail of the PlayList, the ref_thumbnail_index specifying a thumbnail is placed in FIGS. 8 and 9 in UIAppInfoPlayList( ) in TableOfPlayLists( ) of an Info.dvr file. Alternatively, the UIAppInfoPlayList( ) may be placed not in Info.dvr but in each PlayList file. In such case, the UIAppInfoPlayList( ) is moved from TableOfPlayLists( ) to PlayList( ) in the PlayList file. So, the syntax shown in FIG. 8 is as the syntax shown in FIG. 27, whilst the syntax shown in FIG. 14 is as the syntax shown in FIG. 28. The UIAppInfoPlayList( ) in FIG. 28 is as the syntax shown in FIG. 29, in which is inserted ref_thumbnail_index.

Thumbnail recording is possible with the above-described file and the syntax.

Figure 30:
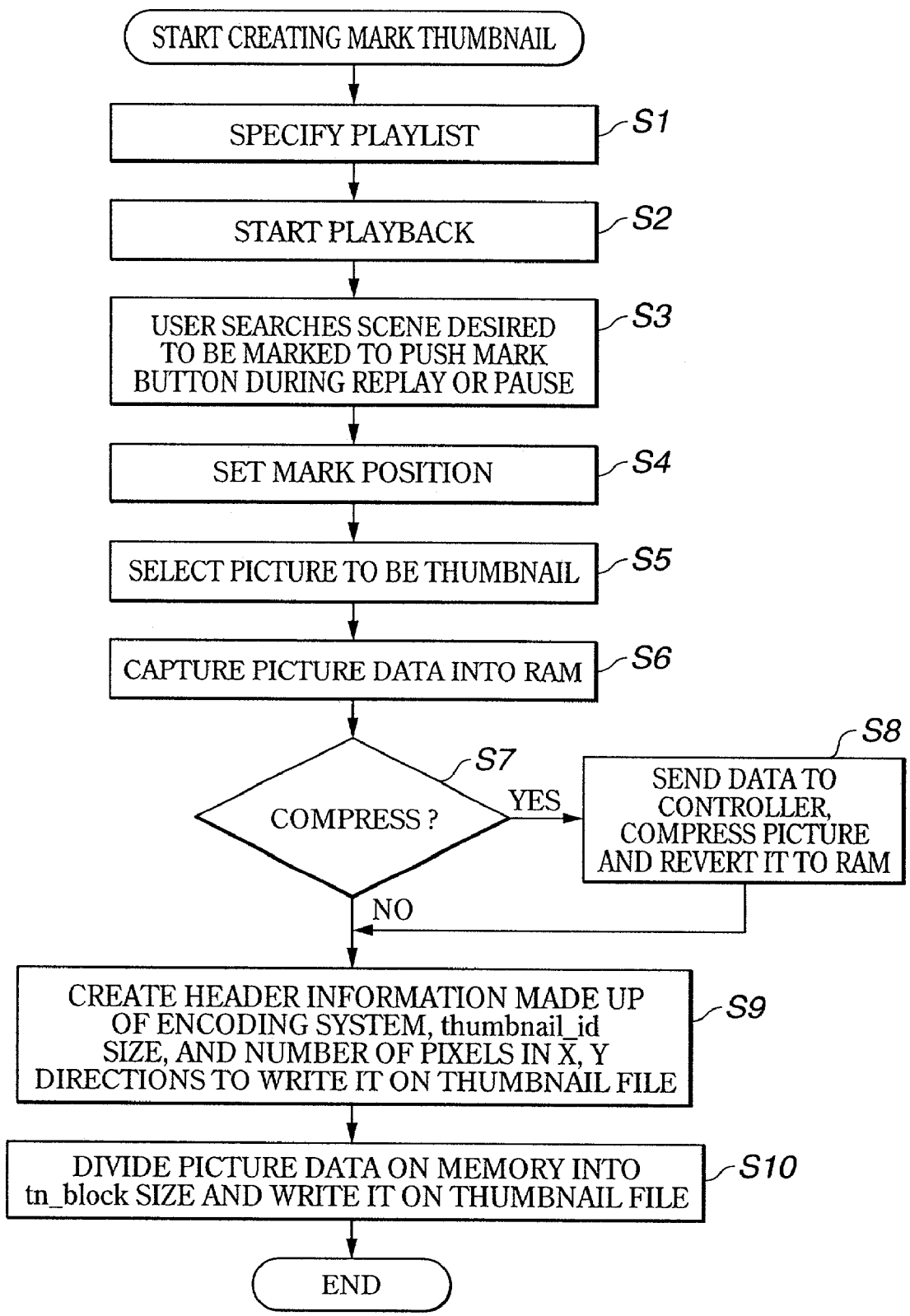
FIG. 30 is a flowchart showing the sequence for creating a mark thumbnail.

Referring to the flowchart of FIG. 30, creation of a mark thumbnail is explained. At step S1, the user selects the PlayList desired to be reproduced. At step S2, an AV stream starts to be reproduced, based on the selected PlayList. At step S3, the user views the AV stream being reproduced to search a scene desired to be marked. If the user has succeeded in searching the scene to be marked, he or she acts on a mark button of a remote controller, not shown, annexed to the recording and/or reproducing apparatus 1. This operation may be made during playback or during pause.

If a mark button is acted on by the user at step S3, the mark position is determined at step S4 as a processing corresponding to user command. If the mark position is set, a picture which is to be a thumbnail picture is selected at step S5. At a time point when the mark position is specified, the controller 23 (FIG. 1) may inquire of the user whether or not the thumbnail is to be formed and, if the thumbnail is to be formed, the controller 23 may furnish a candidate thumbnail picture to the user by e.g., intermittent feed to permit the user to select the thumbnail picture.

If the picture which is to be the thumbnail picture has been selected by the user or by the controller 23, the controller 23 captures a picture from the AV encoder 15 to transfer the picture to a RAM (random access memory), not shown, of the controller 23. At step S7, it is verified whether or not the picture is to be compressed. If the picture is verified to be compressed, the controller 23 transfers to step S8 to effect picture compression to return data to the RAM. If it is verified at step S7 that the picture is not to be compressed, the controller 23 skips the processing of step S8 to transfer to step S9.

At step S9, the controller 23 creates the header information, such as thumbnail encoding system, thumbnail_id for identifying a thumbnail, size (number f bytes) and the thumbnail header constituted by the number of pixcls in the X- and Y-directions, to divide the picture data into tu_block( ) units. At step S10, picture data split into the header information and the tn_block( ) is transferred to the ECC unit 20 through write unit 22 so as to be written as mark.thmb file on the recording medium 100.

Figure 31:
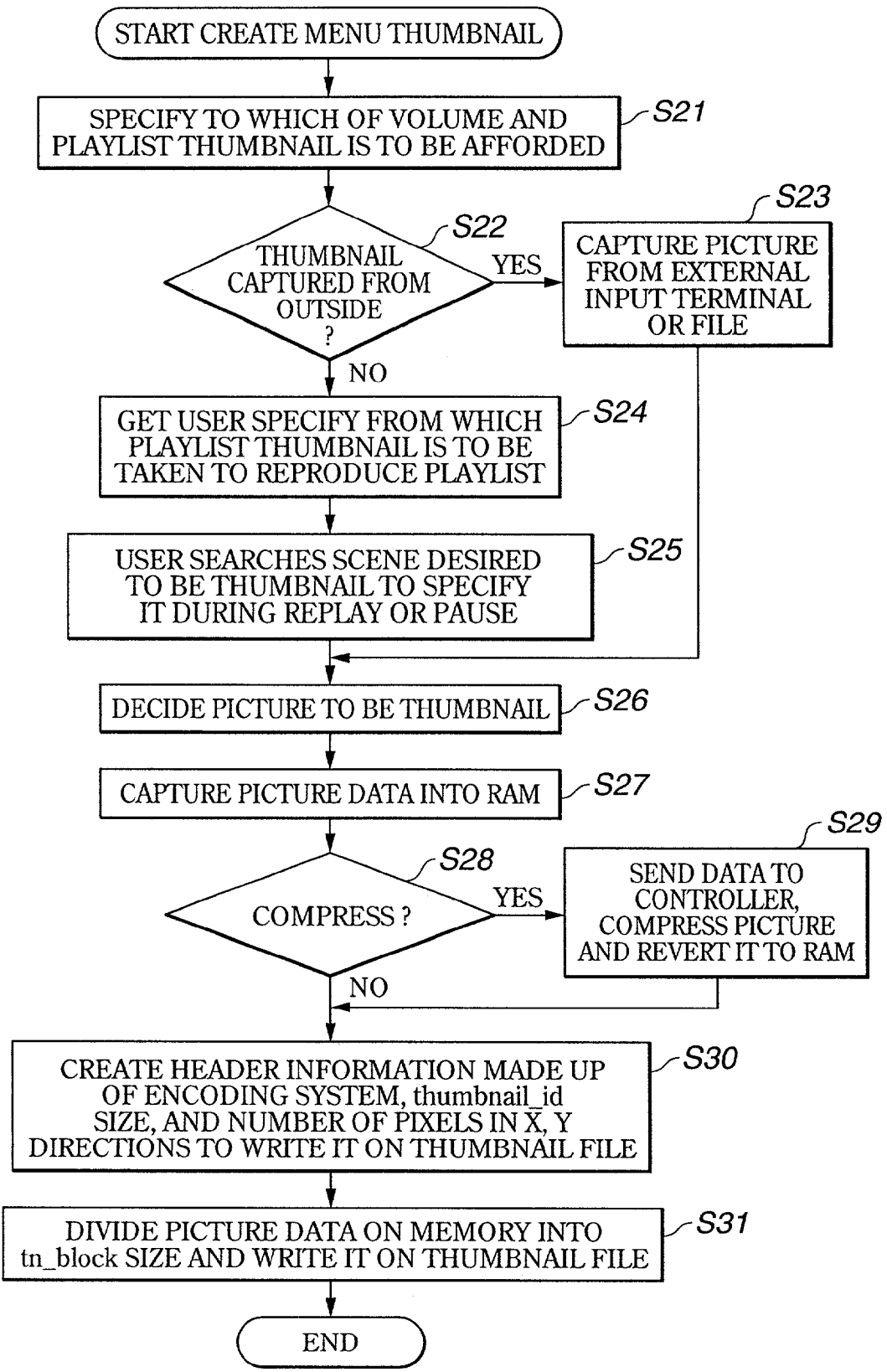
FIG. 31 is a flowchart showing the sequence for creating a menu thumbnail.

Referring to the flowchart of FIG. 31, the method for creating a menu thumbnail is explained. Since the menu thumbnail is assigned to the Volume or to each PlayList, the controller 23 at step S21 allows the user to select the object to which to afford the menu thumbnail. At step S22 the controller 23 allows the user to select whether a thumbnail is to be captured from outside or from a scene in the PlayList.

If it is verified at step S22 that the thumbnail is to be captured from outside, the controller 23 transfers to step S23 where picture data is captured from an input terminal specified by the user or from a file. When the capturing is finished, the controller 23 proceeds to step S26.

If it is verified at step S22 that the thumbnail is not to be captured from outside, the controller 23 transfers to step S24 where the controller 23 first allows the user to select from which PlayList the thumbnail picture is to be captured. The controller 23 then proceeds to reproduce the selected PlayList. At step S25, the controller 23 allows the user to select the scene desired to be rendered a thumbnail.

If the thumbnail picture has been selected at step S23 or step S25, the controller 23 proceeds to step S26. The processing as from step S26 is similar to the processing as from step S5 of the flowchart of FIG. 30 and hence is not explained specifically.

By affording the thumbnail picture to the PlayList as described above, these thumbnail pictures are easier to supervise, thus facilitating, the processing of selecting the AV stream in reproducing the recorded AV stream.

Figure 32:
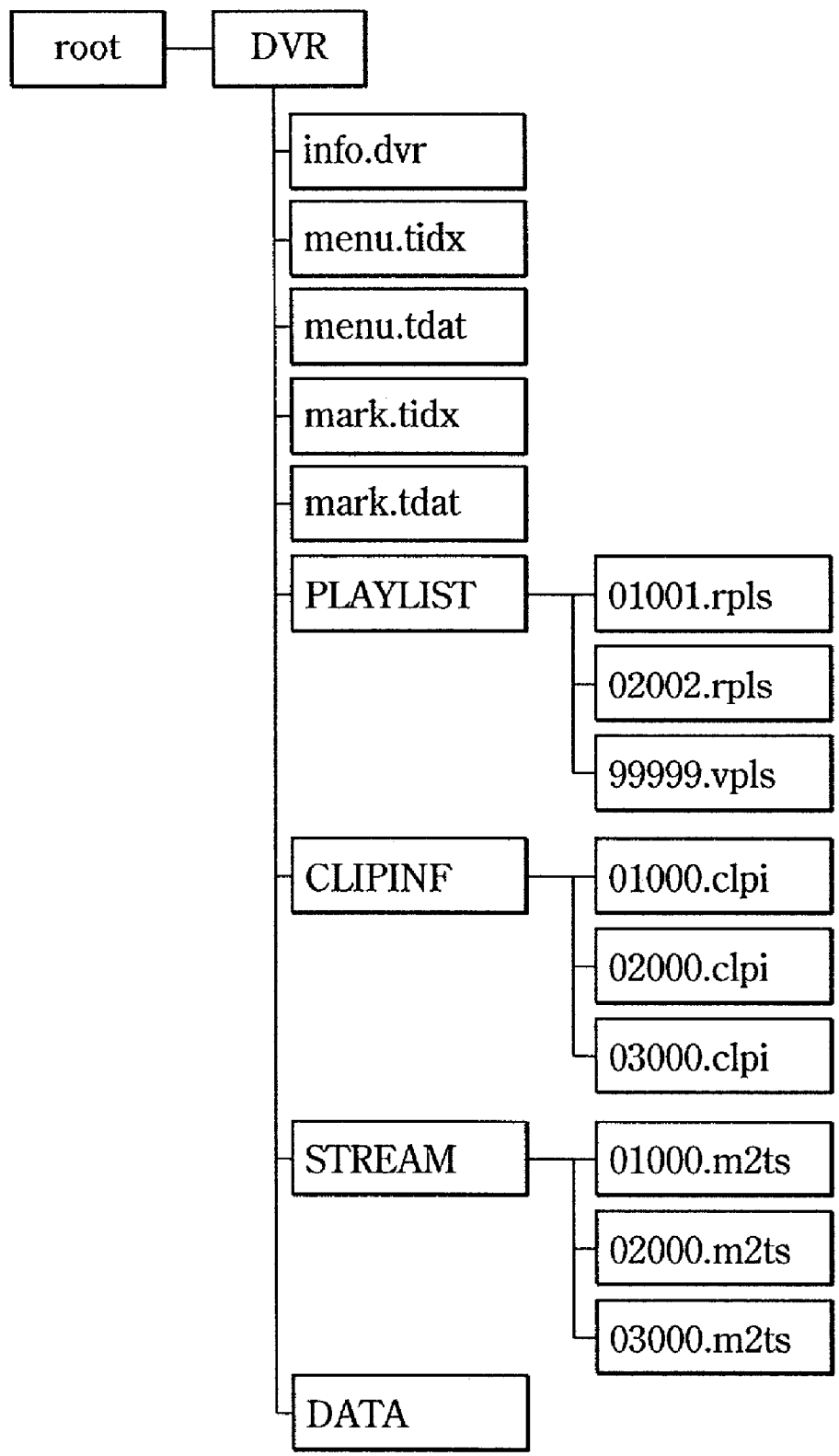
FIG. 32 shows another directory structure of the DVR system.

FIG. 32 shows another embodiment of the directory and the file to be created on the disc. The "menu.tidx" and "menu.tdat" store the information of a representative picture for each menu thumbnail, that is each picture and each PlayList representing the Volume. The header information of the totality of the menu thumbnails is managed as a compact menu.tidx. The picture data of the totality of the menu thumbnails is managed as a compact menu.tdat.

The "mark.tidx" and "mark.tdat" store the information pertinent to a mark thumbnail, that is a picture specified by a mark point. The header information of the totality of the mark thumbnails is managed in a compact mark.tidx, while picture data of the totality of the mark thumbnails is managed in a compact mark.tdat.

That is, in the present fie structure, the thumbnail header information and the thumbnail picture data are managed in separate files. The reason is relevant to the file management method undertaken by the file system. That is, since the file of the thumbnail header information is the relatively crucial information, the file system manages the data by dual writing on the disc.

The reason of doing this is to deal successfully with the case of one of the data being lost due to scratches on the disc, and has the meaning of data backup. The picture data file is not written in duplex because it is of relatively large volume such that the capacity required on the disc is increased due to dual writing.

The encoding method, sampling structure and scanning structure for picture data stored in the "menu.tdat" and "mark.tdat" can be changed from picture to picture. However, the recording and/or reproducing apparatus 1 can be simpler in structure if the totality of the picture data are the same. For example, the JFIF (JPEG file interchange format), component signals and progressive scan format are used.

The syntax and the semantics of these four files are explained. The "menu.tidx" and "mark.tdat" are of the same syntax structure. FIG. 33 shows the syntax structure of "menu.tidx" and "mark.tdat". The version_number is the four numerical figures indicating the version number of the thumbnail header information file.

The length is the number of bytes as a from the byte directly following the length field to the last byte of the menu.tidx/mark.tidx. In case of menu.tidx, the number_of_thumbnails is the number of thumbnails stored in the menu.tdat and, in case of the mark.tidx, it is the number of the thumbnail pictures stored in the mark.tdat.

In the cases of menu.tidx and mark.tidx, tn_block_size indicates the size of one tn_block in menu.tdat and the size of of one tn_block in mark.tdat, respectively. This size is based on 1024 bytes as a unit. For example, tn_block_size=1 indicates that the size of one tn_block is 1024 bytes. One thumbnail picture must be stored in one tn_block.

In the cases of menu.tidx and mark.tidx, the number_of_tn_blocks indicates the number of tn_blocks in the menu.tdat and that in the mark.tdat, respectively. The thumbnail_index indicates the index number of the thumbnail information next following the thumbnail_index field. As the thumbnail_index, the value of 0xFFFF must be used.

In the case of menu.tidx, the thumbnail_index is referenced by ref_thumbnail_index in UIAppInfoVolume and in UIAppInfoPlayList. In the case of mark.tidx, the thumbnail_index is referenced by ref_thumbnail_index in PlayListMark( ) and in ClipMark( ).

In the case of menu.tidx, ref_to_block_id indicates one tn_block in menu.tdat, with the tn_block storing picture data indicated by thumbnail_index. The value of ref_to_block_id references the value of tn_block_id in the menu.tdat syntax.

In the case of mark.tidx, ref_to_block_id indicates one tn_block in mark.tdat, with the tn_block storing picture data indicated by thumbnail_index. The value of ref_to_block_id references the value of tn_block_id in the menu.tdat syntax.

The picture_byte_size indicates the data length of one encoded thumbnail picture pointed by thumbnail_index in bytes. The picture_byte_size must be less than the value of 1024*tn_block_size. That is, the encoding by the recording and/or reproducing apparatus 1 must be such that the data length of one encoded thumbnail picture will be not larger than 1024± value of tn_block_size.

The horizontal_picture_size indicates the number of pixels in the horizontal direction of the encoded thumbnail picture pointed by thumbnail_index. The vertical_picture_size indicates the number of pixels in the vertical direction of the encoded thumbnail picture pointed by thumbnail_index. The display_aspect_ratio shows a display aspect ratio of the encoded thumbnail picture pointed by thumbnail_index. The meaning of the values is shown in FIG. 34.

The color_space indicates the format when converting component signals of Y, Cb and Cr into component signals of R, G and B. The meaning of the values is shown in FIG. 35.

The "menu.tdat" and the "mark.tdat" are of the same syntax structure. FIG. 36 shows the syntax structure of "menu.tdat" and the "mark.tdat". The tn_block is an area in which to store one encoded thumbnail picture. The byte length of one thumbnail picture is not larger than the size of one tn_block. The first byte of one picture data must coincide with the first byte of tn_block.

In the cases of "menu.tdat" and "mark.tdat", the size of one tn_block is indicated by the tn_block_size in menu.tdat and by the tn_block_size in mark.tdat, respectively. Each tn_block is differentiated by the value of tn_block_id when the tn_block appears in the syntax for-loop. In the cases of "menu.tidx" and "mark.tidx", tn_block_id is referenced by ref_to_tn_block_id in the menu.tidx and by ref_to_tn_block_id in the mark.tidx, respectively.

Since the thumbnails are added and deleted every so often, the operations of addition and partial deletion need to be executed readily and speedily. For this reason, "menu.tdat" and "mark.tdat" are of a block structure. One picture data is stored in one tn_block( ).

A tn_block not in use may be present in the tn_block string of "menu.tdat" and "mark.tdat". For example, if, in deleting a preset thumbnail, the thumbnail_index entered in a header information file of the thumbnail is erased, without changing the picture data file of the thumbnail, tn_blocks not in use are produced in the tn_block string.

Figure 37:
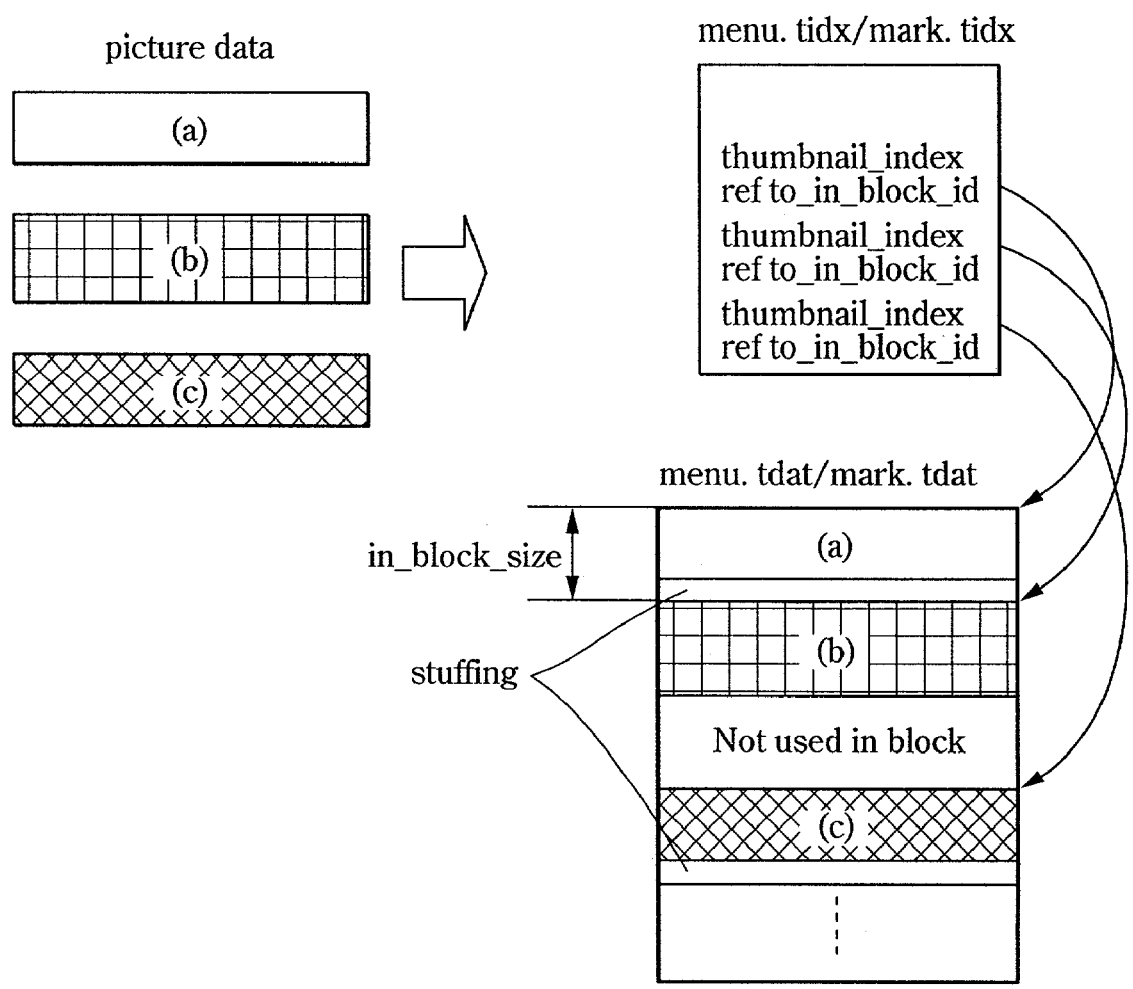
FIG. 37 illustrates data storage to tn_block.

FIG. 37 schematically shows the manner in which thumbnail picture data are stored in the tn_block. As shown in FIG. 37, the byte length of one thumbnail picture is not larger than the size of one tn_block. A tn_block not in use may be present on one tn_block, In the above embodiment, it is assumed that menu_tbat and mark.tbat files are recorded as they are divided into two. Alternatively, each file may be conceived as being one block and a first block of menu.tbat data and a second block of mark.tbat data may be recorded as being one compact file. In recording in one compact file, SequenceInfo, CPI and Clipmark may be recorded as separate blocks.

The above-described sequence of operations may be executed not only by hardware but also by software. If the sequence of operations is to be executed by software, it is installed from a recording medium to a computer in the dedicated hardware of which the program forming the software is installed or to a general-purpose personal computer of FIG. 38 capable of executing various functions based on a variety of programs installed therein.

Figure 38:
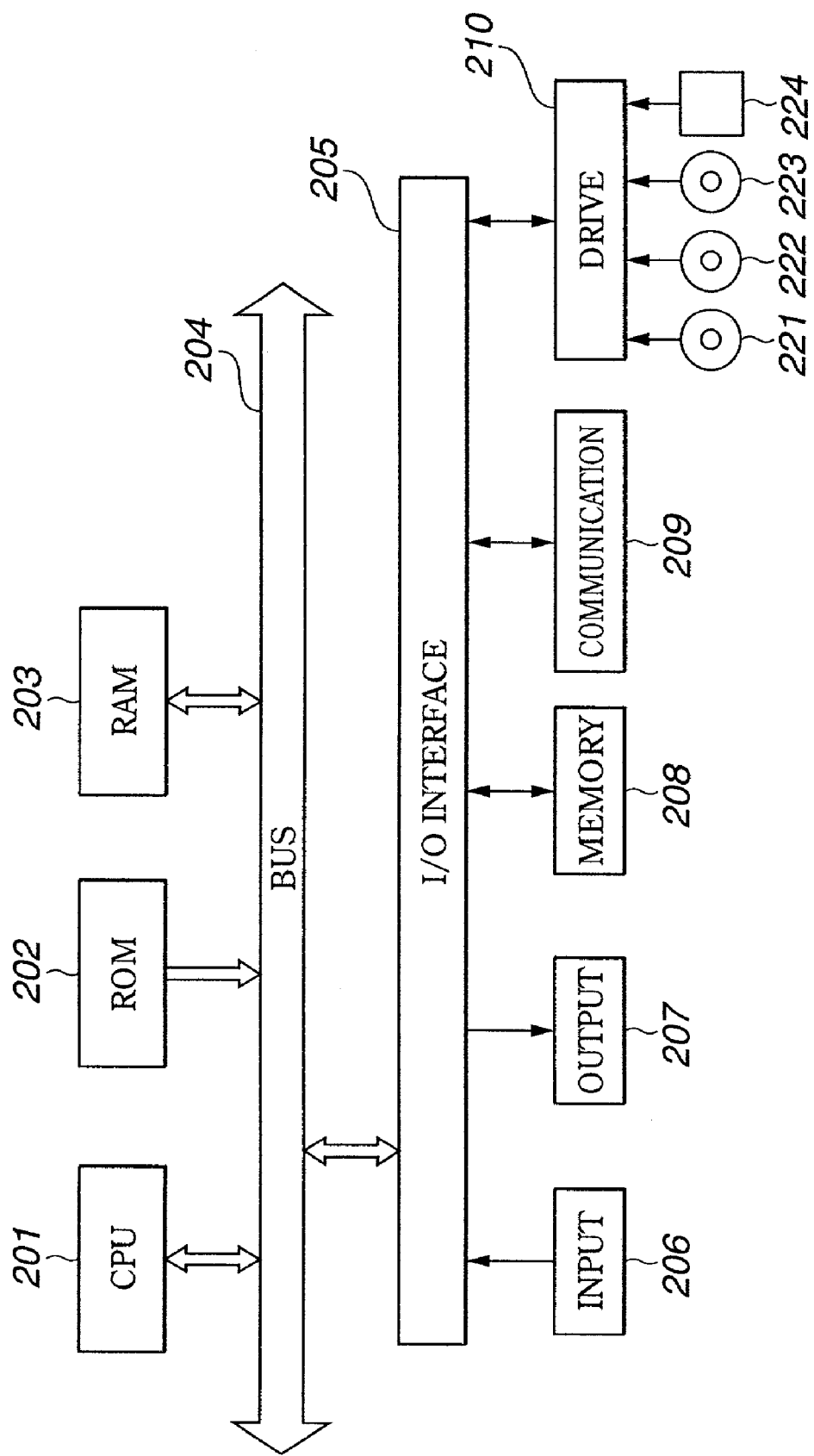
FIG. 38 illustrates a medium.

In the personal computer, shown in FIG. 38, a CPU (central processing unit) 201 executes a variety of operations in accordance with programs stored in a ROM (read-only memory) 202 or programs loaded from a memory 208 to a RAM (random-access memory) 203. There is also stored in the RAM 203 data required in executing various processing operations.

The CPU 201, ROM 202 and the RAM 203 are interconnected over a bus 204. An input/output interface 205 is also coupled to the bus 204.

To the input/output interface 205 are coupled an input unit 206, comprised of a keyboard and a mouse, a display comprised of CRT and an LCD, an output unit 207, comprised of a speaker, a memory 208, comprised of a hard disc and a communication unit 209 comprised of a modem and a terminal adapter. The communication unit 209 executes communication processing over a network.

To the input/output interface 205, there are also connected a drive 210, a magnetic disc 221, an optical disc 222, a magneto-optical disc 223 or a semiconductor memory 224. The program read out therefrom is installed as necessary on the memory 208.

The recording medium is constituted not only by a package medium distributed for furnishing the program to the user, in addition to a computer, such as a magnetic disc 221 carrying the program thereon, inclusive of a floppy disc, an optical disc 222 inclusive of a CD-ROM (Compact Disc-Read-Only memory) or a DVD (Digital Versatile Disc), a magneto-optical disc, inclusive of a Mini-Disc, or a semiconductor memory 224, but also by a hard disc, inclusive of a ROM 202 carrying a program and a memory 208, furnished to the user as it is built-in in a computer, as shown in FIG. 38.

In the present specification, the steps of the program furnished by the medium include not only the chronological processing in accordance with the sequence indicated, but also the processing not chronologically but in parallel or separately.

Additionally, in the specification, the system means an entire apparatus comprised of plural component devices.

INDUSTRIAL APPLICABILITY

In the recording method and apparatus and in the first program, according to the present invention, a thumbnail picture representing the moving picture data is generated from input moving picture data as first thumbnail data. Form the moving picture data, a thumbnail picture of a picture extracted as being a characteristic picture, or a thumbnail picture of a picture specified by a user, is generated as second thumbnail data, and the first and second thumbnail data are recorded as respective independent groups on the recording medium. So, the user is allowed to select recorded data readily using the recorded picture data.

In the reproducing method and apparatus and in the second program, according to the present invention, if playback of an AV stream is commanded, management data supervising picture data of a thumbnail picture representing the contents of the AV stream is read out, and the picture data is read out based on the management data read out by readout means. From the AV stream, picture data of a thumbnail picture of a picture extracted from it as a characteristic picture or picture data of a thumbnail picture of a picture specified by a user, and management data supervising the picture data, are read out, and the picture data are read out based on the read-out management data. So, the user is allowed to select recorded data readily using the read-out management data.

The invention claimed is:

1. A recording apparatus comprising:
    means for generating, from input moving picture data, a plurality of menu thumbnail pictures representative of contents of said moving picture data, as first thumbnail data, and for generating, from said moving picture data, a plurality of mark thumbnail pictures of a picture extracted as a characteristic picture, or a thumbnail picture of a picture specified by a user, as second thumbnail data, said first thumbnail data being generated as a first independent menu thumbnail file of only said plurality of menu thumbnail pictures of said first thumbnail data, and said second thumbnail data being generated as a second independent mark thumbnail file of only said plurality of mark thumbnail pictures of said second thumbnail data; and
    means for recording said first thumbnail data and the second thumbnail data, generated by said generating means, as independent groups on a recording medium,
    wherein said menu thumbnail file includes only one thumbnail picture per a playlist, each playlist further including a plurality of said mark thumbnail pictures and indicating a database of a group of playback domains of the input moving picture data, and
    wherein said menu thumbnail picture is selected from a picture of contents or a picture stored in an external device.

2. The recording apparatus according to claim 1 wherein said generating means generates first management data supervising said first thumbnail data with a number corresponding to the first thumbnail data, said generating means also generating second management data supervising said second thumbnail data with a number corresponding to the second thumbnail data; said recording means recording said first and second management data in said recording medium.

3. The recording apparatus according to claim 2 wherein said first and second management data include data specifying the format of the picture data of the thumbnail data being supervised.

4. The recording apparatus according to claim 2 wherein said recording means records picture data of said thumbnail picture contained in said first or second management data in terms of a block of a preset size as a unit.

5. The recording apparatus according to claim 1 wherein said recording means records the information representing the referencing destination of said first thumbnail data as a separate file on said recording medium.

6. The recording apparatus according to claim 1 wherein said recording means further records the information indicating the referencing destination of said thumbnail picture contained in said second thumbnail data.

7. The recording apparatus according to claim 1, wherein each menu thumbnail picture is representative of contents of a respective of the playlists in the moving picture data, and each mark thumbnail picture is used in a submenu for representing details of the respective playlist.

8. A recording method comprising:
    generating, from input moving picture data, a plurality of menu thumbnail pictures representative of contents of said moving picture data, as first thumbnail data, and generating, from said moving picture data, a plurality of mark thumbnail pictures of a picture extracted as a characteristic picture, or a thumbnail picture of a picture specified by a user, as a second thumbnail data, said first thumbnail data being generated as a first independent menu thumbnail file of only said plurality of menu thumbnail pictures of said first thumbnail data, and said second thumbnail data being generated as a second independent mark thumbnail file of only said plurality of mark thumbnail pictures of said second thumbnail data; and
    exercising control for recording said first thumbnail data and the second thumbnail data, generated by said generating, as independent groups on a recording medium,
    wherein said menu thumbnail file includes only one thumbnail picture per a playlist, each playlist further including a plurality of said mark thumbnail pictures and indicating a database of a group of playback domains of the input moving picture data, and
    wherein said menu thumbnail picture is selected from a picture of contents or a picture stored in an external device.

9. The recording method according to claim 8, wherein each menu thumbnail picture is representative of contents of a respective of the playlists in the moving picture data, and each mark thumbnail picture is used in a submenu for representing details of the respective playlist.

10. A computer-readable recording medium having recorded thereon a computer-readable program, said computer-readable program comprising:
    generating, from input moving picture data, a plurality of menu thumbnail pictures representative of contents of said moving picture data, as first thumbnail data, and generating, from said moving picture data, a plurality of mark thumbnail pictures of a picture extracted as a characteristic picture, or a thumbnail picture of a picture specified by a user, as a second thumbnail data, said first thumbnail data being generated as a first independent menu thumbnail file of only said plurality of menu thumbnail pictures of said first thumbnail data, and said second thumbnail data being generated as a second independent file of only said plurality of mark thumbnail pictures of said second thumbnail data; and exercising control for recording said first thumbnail data and the second thumbnail data, generated by said generating, as independent groups on a recording medium, wherein said menu thumbnail file includes only one thumbnail picture per a playlist, each playlist further including a plurality of said mark thumbnail pictures and indicating a database of a group of playback domains of the input moving picture data, and wherein said menu thumbnail picture is selected from a picture of contents or a picture stored in an external device.

11. The computer-readable recording medium according to claim 10, wherein each menu thumbnail picture is representative of contents of a respective of the playlists in the moving picture data, and each mark thumbnail picture is used in a submenu for representing details of the respective playlist.

12. A reproducing apparatus comprising:

first readout means for reading out management data supervising picture data of a plurality of menu thumbnail pictures representative of contents of said picture data in case playback of said picture data is commanded;

second readout means for reading out said picture data based on said management data read out by said readout means;

third readout means for reading out picture data of a plurality of mark thumbnail pictures of a picture extracted as a characteristic picture from said picture data or picture data of a thumbnail picture of a picture specified by a user, and management data supervising said picture data, said first thumbnail data being a first independent menu thumbnail file of only said plurality of menu thumbnail pictures of said first thumbnail data, and said second thumbnail data being generated as a second independent mark thumbnail file of only said plurality of mark thumbnail pictures of said second thumbnail data; and fourth readout means for reading out said picture data based on said management data read out from said third readout means, wherein said menu thumbnail file includes only one thumbnail picture per a playlist, each playlist further including a plurality of said mark thumbnail pictures and indicating a database of a group of playback domains of the input moving picture data, and wherein said menu thumbnail picture is selected from a picture of contents or a picture stored in an external device.

13. The reproducing apparatus according to claim 12, wherein each menu thumbnail picture is representative of contents of a respective of the playlists in the moving picture data, and each mark thumbnail picture is used in a submenu for representing details of the respective playlist.

14. A reproducing method comprising:

a first readout controlling reading out management data supervising picture data of a plurality of menu thumbnail pictures representative of contents of said picture data in case playback of said picture data is commanded;

a second readout controlling the readout of said picture data based on said management data readout-controlled by the processing of said first readout control;

a third readout controlling reading out picture data of a plurality of mark thumbnail pictures of a picture extracted as a characteristic picture from said picture data or picture data of a thumbnail picture of a picture specified by a user, and management data supervising said picture data, said first thumbnail data being generated as a first independent menu thumbnail file of only said plurality of menu thumbnail pictures of said first thumbnail data, and said second thumbnail data being generated as a second independent mark thumbnail file of only said plurality of mark thumbnail pictures of said second thumbnail data; and a fourth readout controlling reading out said picture data based on said management data readout-controlled by the processing of said third readout control, wherein said menu thumbnail file includes only one thumbnail picture per a playlist, each playlist further including a plurality of said mark thumbnail pictures and indicating a database of a group of playback domains of the input moving picture data, and wherein said menu thumbnail picture is selected from a picture of contents or a picture stored in an external device.

15. The reproducing method according to claim 14, wherein each menu thumbnail picture is representative of contents of a respective of the playlists in the moving picture data, and each mark thumbnail picture is used in a submenu for representing details of the respective playlist.

16. A computer-readable recording medium having recorded thereon a computer-readable program, said computer-readable program comprising:

a first readout controlling the readout of management data supervising picture data of a plurality of menu thumbnail we pictures representative of contents of said picture data in case playback of said picture data is commanded;

a second readout controlling the readout of said picture data based on said management data readout-controlled by the processing of said first readout control;

a third readout controlling reading out picture data of a plurality of mark thumbnail pictures of a picture extracted as a characteristic picture from said picture data or picture data of a thumbnail picture of a picture specified by a user, and management data supervising said picture data, said first thumbnail data being generated as a first independent menu thumbnail file of only said plurality of menu thumbnail pictures of said first thumbnail data, and said second thumbnail data being generated as a second independent mark thumbnail file of only said plurality of mark thumbnail pictures of said second thumbnail data;

a fourth readout controlling reading out said picture data based on said management data readout-controlled by the processing of said third readout controlling, wherein said menu thumbnail file includes only one thumbnail picture per a playlist, each playlist further including a plurality of said mark thumbnail pictures and indicating a database of a group of playback domains of the input moving picture data, and wherein said menu thumbnail picture is selected from a picture of contents or a picture stored in an external device.

17. The computer-readable recording medium according to claim 16, wherein each menu thumbnail picture is representative of contents of a respective of the playlists in the moving picture data, and each mark thumbnail picture is used in a submenu for representing details of the respective playlist.

* * * * *